US012052529B1

(12) United States Patent
Gendelman et al.

(10) Patent No.: US 12,052,529 B1
(45) Date of Patent: Jul. 30, 2024

(54) TECHNIQUES FOR OBTAINING IMAGES OF ITEMS

(71) Applicant: Amazon Technologies, Inc., Seattle, WA (US)

(72) Inventors: Sofia Gendelman, Haifa (IL); Orel Shai, Kiryat Motzkin (IL); Lee Abe Teichner, Haifa (IL); Ran Yad Shalom, Ramat Gan (IL); Amir Nahir, Megadim (IL); Alex Umansky, Haifa (IL); Hadi Khader, Hammam (IL); Jeffrey Norbert Coonen, Rehovot (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/487,876

(22) Filed: Sep. 28, 2021

(51) Int. Cl.
  *H04N 7/18* (2006.01)
  *G06F 16/783* (2019.01)
  *G06Q 10/087* (2023.01)
  *G06T 7/00* (2017.01)
  *H04N 5/247* (2006.01)

(52) U.S. Cl.
  CPC ......... *H04N 7/181* (2013.01); *G06F 16/7837* (2019.01); *G06Q 10/087* (2013.01); *G06T 7/0002* (2013.01); *G06T 2207/10016* (2013.01); *G06T 2207/30168* (2013.01); *G06T 2207/30232* (2013.01); *G06T 2207/30244* (2013.01)

(58) Field of Classification Search
  None
  See application file for complete search history.

(56) References Cited

U.S. PATENT DOCUMENTS

| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 10,127,438 | B1 | 11/2018 | Fisher et al. |
| 10,133,933 | B1 | 11/2018 | Fisher et al. |
| 10,699,421 | B1 * | 6/2020 | Cherevatsky .......... G06K 9/623 |
| 2013/0284806 | A1 | 10/2013 | Margalit |
| 2019/0251499 | A1 * | 8/2019 | Kumar ................. G06Q 10/087 |
| 2022/0083074 | A1 * | 3/2022 | Ferrer .................... B25J 9/1697 |

* cited by examiner

*Primary Examiner* — Samuel D Fereja
(74) *Attorney, Agent, or Firm* — Lee & Hayes, P.C.

(57) ABSTRACT

This disclosure describes, in part, techniques for retrieving images based on detecting events. For instance, system(s) may detect an event, such as an event associated with a collection of images for an item. Based on detecting the event, the system(s) may determine an area within a facility, such as an inventory location, for retrieving image data. The system(s) may then determine one or more imaging devices that have field(s) of view of the area. Additionally, the system(s) may score the imaging device(s) based on visibility data associated with the imaging device(s). The system(s) may also determine occlusion data for image data generated by the imaging device(s). Using the scores and the occlusion data, the system(s) may then select image data that represents the area. The system(s) may then store the image data in one or more data stores, such as with the collection of images.

20 Claims, 17 Drawing Sheets

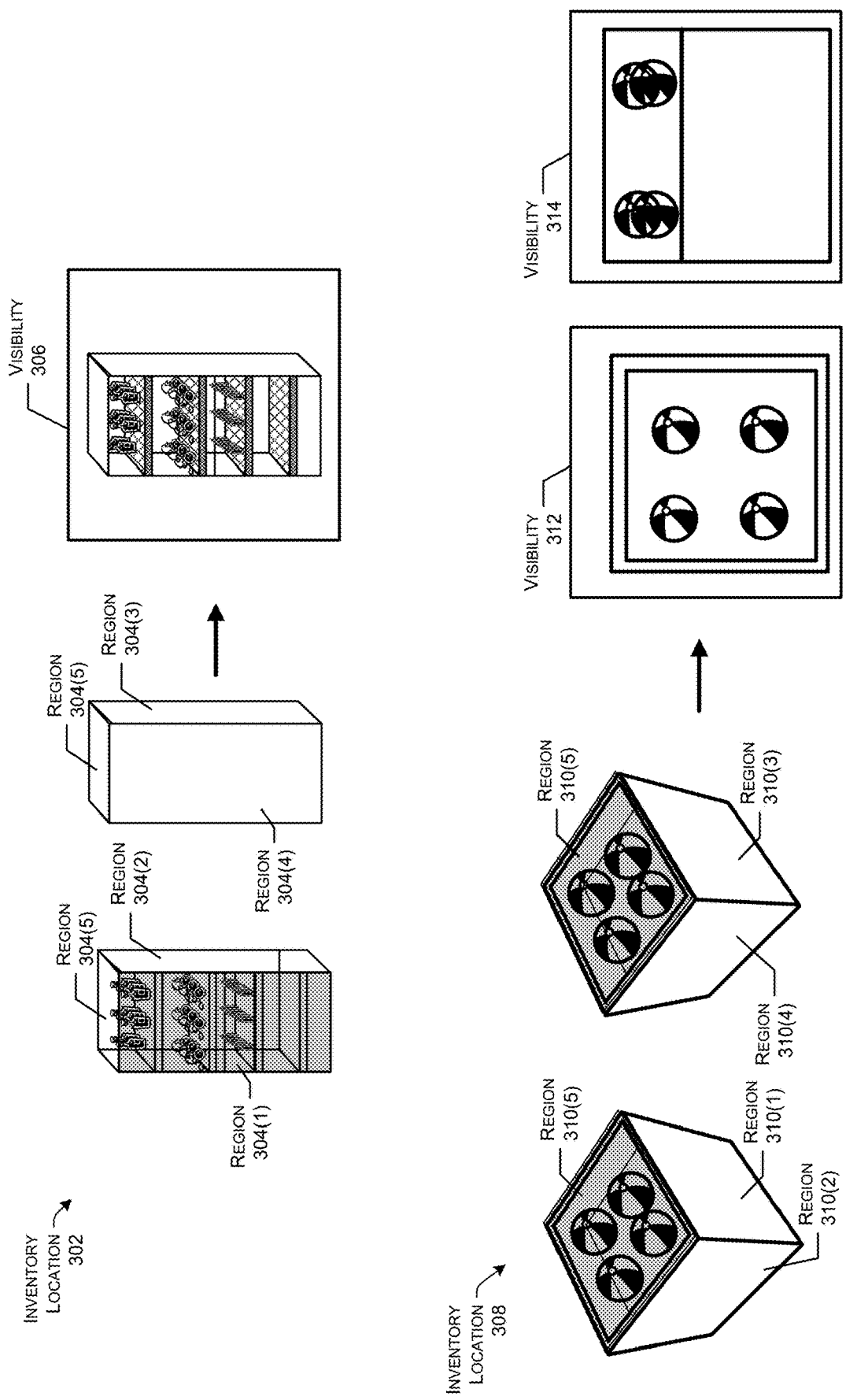

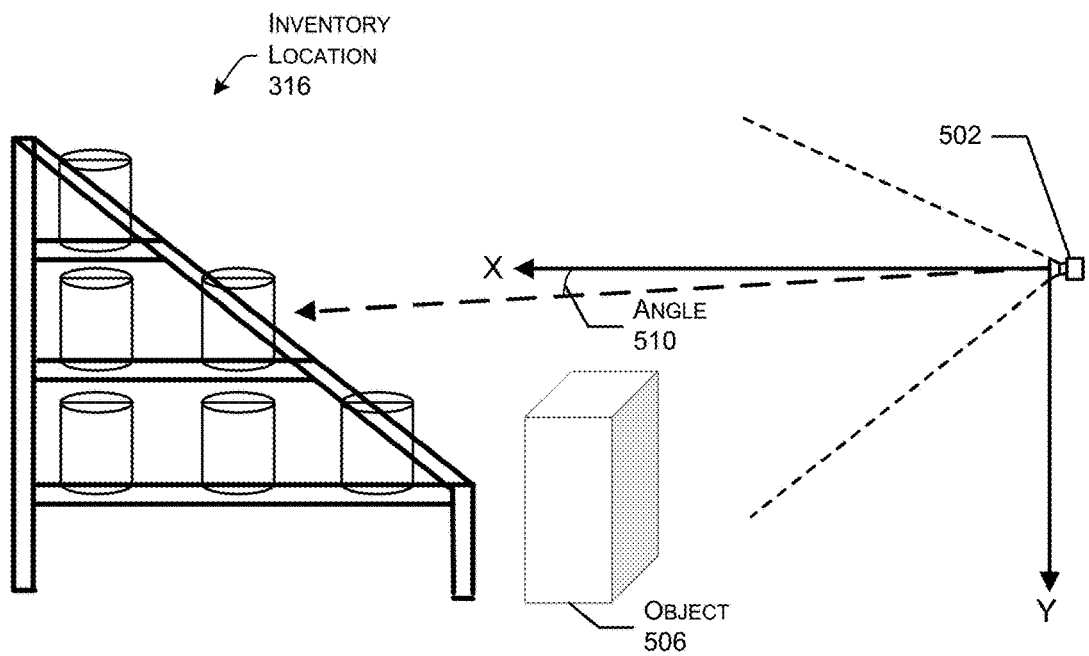
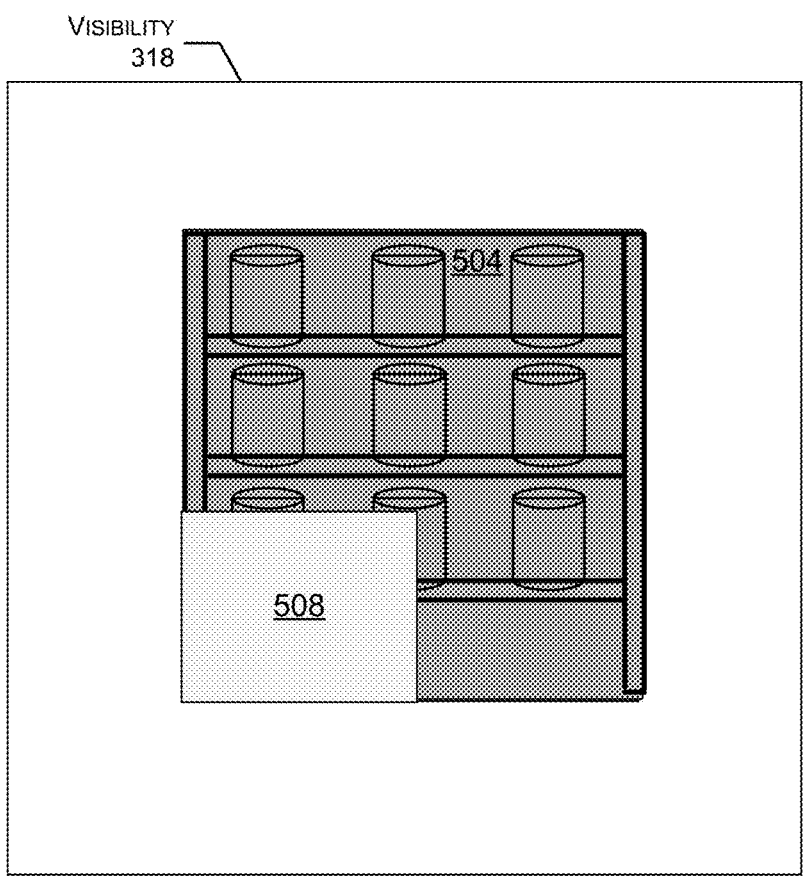
FIG. 5

| | | | |
|---|---|---|---|
| \multicolumn{4}{c}{LIST 702} | | | |
| IMAGING DEVICE 704(1) | SCORE 706(1) | REGION 708(1) | SELECTED IMAGE 710(1) |
| IMAGING DEVICE 704(2) | SCORE 706(2) | REGION 708(1) | SELECTED IMAGE 710(2) |
| IMAGING DEVICE 704(3) | SCORE 706(3) | REGION 708(2) | |
| IMAGING DEVICE 704(4) | SCORE 706(4) | REGION 708(1) | SELECTED IMAGE 710(3) |
| IMAGING DEVICE 704(5) | SCORE 706(5) | REGION 708(2) | SELECTED IMAGE 710(4) |
| IMAGING DEVICE 704(6) | SCORE 706(6) | REGION 708(2) | SELECTED IMAGE 710(5) |

FIG. 7

PRIORITY DATA
1002

| ITEM IDENTIFIER 1004(1) | EVENT TYPE 1006(1) | LOCATION 1008(1) | TIME 1010(1) | PRIORITY 1012(1) |
| ITEM IDENTIFIER 1004(2) | EVENT TYPE 1006(2) | LOCATION 1008(2) | TIME 1010(2) | PRIORITY 1012(2) |
| ITEM IDENTIFIER 1004(3) | EVENT TYPE 1006(3) | LOCATION 1008(3) | TIME 1010(3) | PRIORITY 1012(3) |
| ITEM IDENTIFIER 1004(4) | EVENT TYPE 1006(4) | LOCATION 1008(4) | TIME 1010(4) | PRIORITY 1012(4) |
| ITEM IDENTIFIER 1004(5) | EVENT TYPE 1006(5) | LOCATION 1008(5) | TIME 1010(5) | PRIORITY 1012(5) |
| ITEM IDENTIFIER 1004(6) | EVENT TYPE 1006(6) | LOCATION 1008(6) | TIME 1010(6) | PRIORITY 1012(6) |

FIG. 10

TECHNIQUES FOR OBTAINING IMAGES OF ITEMS

BACKGROUND

A materials handling facility, such as a warehouse or a retail store, often provides a user with a tote (e.g., carts, baskets, etc.) to facilitate the processes by which the user locates, identifies, retrieves, and transports items at the facility. While the user is retrieving or transporting the items within the facility, cameras located within the facility may capture images of the items. A system may then analyze the images in order to try and identify the items retrieved by the user. To perform the analysis, the system may use other images of the item, where these other images are provided the system before the items are placed within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A-3B illustrate examples of identifying accessible regions associated with inventory locations, in accordance with examples of the present disclosure.

FIG. 5 illustrates an example of determining a visibility score for an imaging device, in accordance with examples of the present disclosure.

FIG. 7 illustrates an example of filtering imaging devices based on scores, in accordance with examples of the present disclosure.

FIG. 10 illustrates an example of prioritizing items when collecting image data for collections of images, in accordance with examples of the present disclosure.

DETAILED DESCRIPTION

Figure 1:
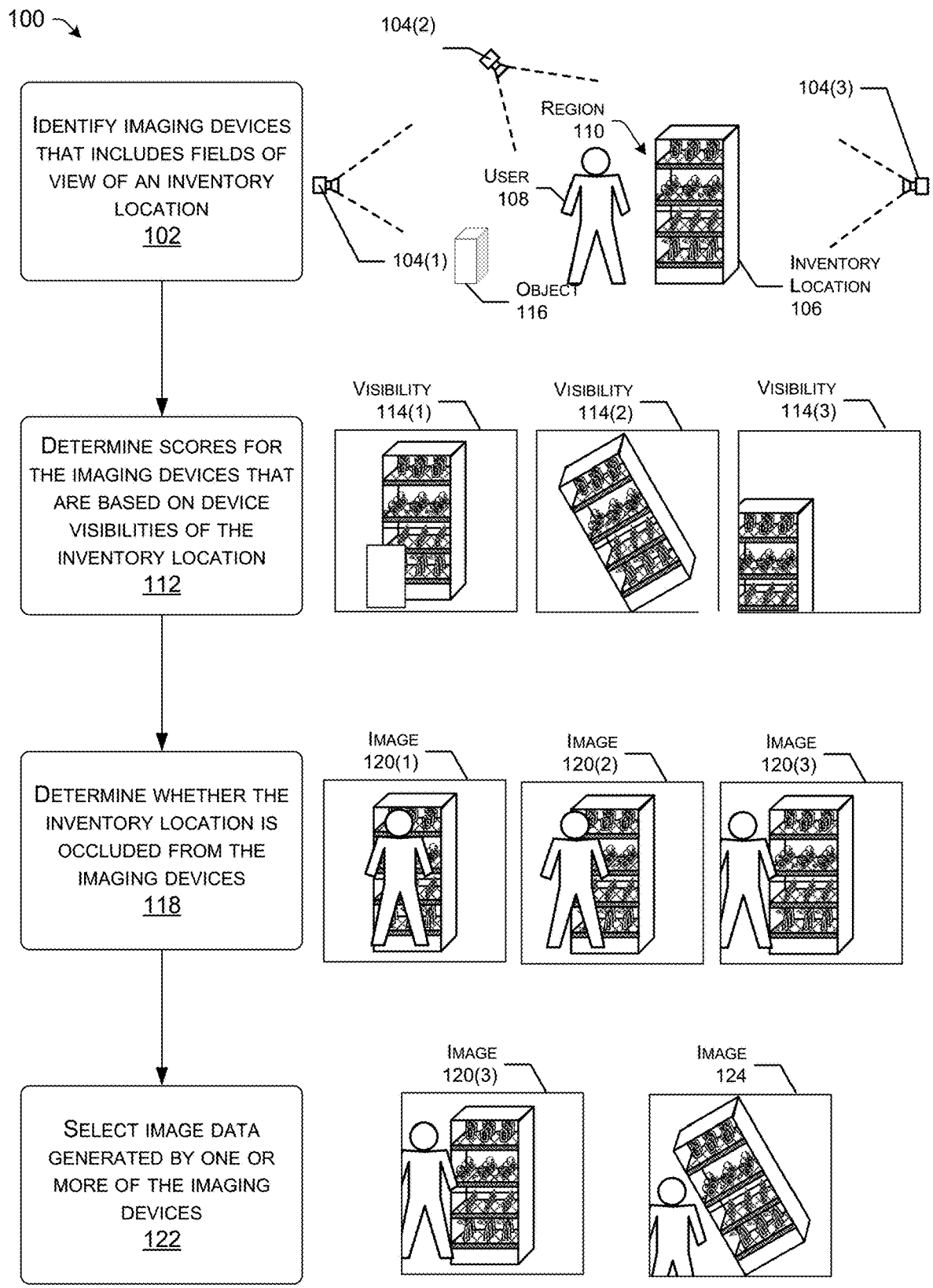
FIG. 1 illustrates a flow diagram of an example process for retrieving image data representing an inventory location, in accordance with examples of the present disclosure.

This disclosure is directed to, at least in part, both techniques for retrieving images of items at a facility as well as techniques for updating collections of images for the items. For instance, system(s) may retrieve image data representing image(s) depicting an item at the facility. To retrieve the image data, the system(s) may determine a location of the item at the facility, such as a location of an inventory location that holds the item. The system(s) may then identify imaging device(s) that include field(s)-of-view (FOV(s)) that include the inventory location and/or the item. After identifying the imaging device(s), the system(s) may analyze image data generated by the imaging device(s) in order to identify images that depict the inventory location and/or the item and which are not obstructed by object(s) within the facility. The system(s) may then store the image data representing the image(s) in one or more data stores, such as part of a collection of images associated with the item. In some examples, based on detecting an event, the system(s) again perform these processes to update the collection of images. Additionally, in some examples, the system(s) may use the collection of images to identify items that are associated with events that occur at the facility.

For more detail, the system(s) may determine to retrieve image data representing images depicting an item and/or an inventory location for which the item is located. In some examples, the system(s) determine to retrieve the image data based on detecting the occurrence of an event, which is described in more detail below. Additionally, or alternatively, in some examples, the system(s) determine to retrieve the image data based on receiving a request for the images, where the request includes information about the item and/or the inventory location. For example, the request may include an identifier of the facility, an identifier of the inventory location, an identifier of the item, a location associated with the inventory location within the facility, a location of the item within the facility, a time period for the images, and/or any other information. As described herein, in some examples, a location may be associated with coordinates, such as a x-coordinate, a y-coordinate, and a z-coordinate within the facility. Additionally, or alternatively, in some examples, a location may be associated with a general area within the facility, such as a floor, a room, a department, and/or any other type of area within the facility.

The system(s) may then identify imaging devices, such as camera devices, that include FOVs of the inventory location and/or the item. For example, the system(s) may initially determine region(s) (referred to, in some examples, as "accessible region(s)") of the inventory location that is accessible to one or more users. In some examples, the system(s) make the determination based on the type of the inventory location (e.g., a basket, a table, a shelf, a counter, a refrigerator, etc.). For example, the system(s) may determine that a basket is only accessible from a top region and a shelf is only accessible from a front region. The system(s) may then use the accessible region(s) to determine region(s) (referred to, in some examples, as "interested region(s)") of the inventory location for identifying the imaging devices, using one or more processes described below. After identifying the interested region(s), the system(s) may use the interested region(s) to identify imaging devices that include FOVs representing the interested region(s). In some examples, the system(s) identify the imaging devices by generating a request that includes at least the identifier of the facility, the identifier of the inventory location, the identifier of the item, the interested region(s), the location within the facility for the inventory location, the location(s) within the facility for the interested region(s), the location within the facility for the item, and/or any other information. The remote system(s) may then use the request to retrieve data that identifies the imaging devices.

The system(s) may then determine a respective visibility associated with each of the imaging devices and the inventory location. For example, and for each imaging device, the system(s) may receive and/or generate data (referred to, in some examples, as "visibility data") representing a percentage of first pixels represented by image data that are associated with the inventory location, a percentage of the first pixels that are associated one or more obstructing objects, a percentage second pixels represented by the image data that are associated with the interested region(s), a percentage of the second pixels that are associated one or more obstructing objects, a percentage of the inventory location that is visible from the imaging device, a percentage of the interested region(s) that are visible by the imaging device, an angle (e.g., an angle in the x-direction, an angle in the y-direction, and/or an angle in the z-direction) of the imaging device with respect to the inventory location, and/or any other visibility information. The system(s) may then use the visibility data to determine a respective score for each imaging device.

The system(s) may then determine a respective occlusion associated with each of the selected imaging devices and the inventory location. For example, and for each of the selected imaging devices, the system(s) may receive and/or generate data (referred to, in some examples, as "occlusion data") representing a percentage of the image data that is occluded by one or more users (e.g., a percentage of the pixels that represent the user(s)), a percentage of the first pixels that are obstructed by the user(s) (e.g., the percentage of the inventory location that is obstructed by the user(s) within the image), a percentage of the second pixel(s) that are obstructed by the user(s) (e.g., the percentage of the interested region(s) that are obstructed by the user(s) within the image), segmented portions of the image data that represent various portions of the user(s) (e.g., pixels that represents a head of a user, pixels that represent the arm of the user, pixels that represent the hand of the user, etc.), and/or any other information. The system(s) may then use one or more of the percentages above in order to select at least an image for the imaging device.

For example, the system(s) may compare the percentage to a threshold percentage in order to determine whether the percentage satisfies (e.g., is less than) the threshold percentage or does not satisfy (e.g., is equal to or greater than) the threshold percentage. The threshold percentage may include, but is not limited to, 5%, 10%, 20%, and/or any other percentage. In some examples, and for each imaging device, the system(s) may analyze the images of the video in temporal order and select the first image that is associated with a percentage that satisfies the threshold percentage. In such examples, if the system(s) determine that none of the images within the video include a percentage that satisfies the threshold image, then the system(s) may determine to disregard the imaging device. The system(s) may then output data representing at least the identifier(s) of the imaging device(s) that are associated with selected image(s), timestamp(s) of the selected image(s), and/or any other information.

The system(s) may then filter the imaging devices using the scores from the visibility processing and the output from the obstruction processing. For example, the system(s) may select the imaging device that includes the highest score and a selected image, the two imaging devices that include the two highest scores and selected images, the three imaging devices that include the three highest scores and selected images, and/or so forth. Additionally, when selecting imaging devices based on the scores, the system(s) may select the imaging devices such that there is at least one imaging device that includes a FOV for each of the interested regions. For example, the system(s) may determine that the interested regions for an inventory location include a top region and a front region. The system(s) may also determine that the scores indicate that the three imaging devices with the three highest scores include FOVs of the top region and the fourth imaging device with the fourth highest score includes a FOV of the front region. As such, if the system(s) are selecting only the three imaging devices, then the system(s) may select the two imaging devices with the two highest scores and the fourth imaging device with the fourth highest score.

After filtering the imaging device(s), the system(s) may retrieve the image data representing the selected images for each of the selected imaging device(s). In some examples, to retrieve the image data for an imaging device, the system(s) may generate data representing a request, where the data represents at least the identifier associated with the imaging device and the timestamp associated with the selected image. The system(s) may then use the data to retrieve the image data. In some examples, the system(s) may then process the image data using one or more image processing techniques. For a first example, the system(s) may process the image data by removing and/or obfuscating pixels that represent user(s). For a second example, the system(s) may process the image data by cropping the selected image to only represent the inventory location, the interested region(s), a specific item, and/or the like. The system(s) may perform similar processes for each of the other selected images for the other selected imaging device(s).

The system(s) may then store the image data representing the selected image(s) in one or more data stores. In some examples, such as when the system(s) determined to retrieve the image data based on detecting an event, the system(s) may store the image data as part of a collection of images associated with an item, which is described in more detail below. In some examples, such as when the system(s) determined to retrieve the image data based on receiving the request, the system(s) may also generate a notification indicating that the image data is stored in the one or more data stores. In some examples, the notification may include a link, an address, and/or any other mechanism for accessing the image data. The system(s) may then send the notification to one or more computing devices associated with the request.

As described in the examples above, the system(s) may retrieve the image data based on detecting the occurrence of an event. In some examples, such as when the system(s) already store a collection of images associated with an item, the event may be associated with a period of time elapsing. For example, the system(s) may store information about the images included in the collection of images, such as timestamps indicating when the image data representing the images was generated. The system(s) may then use the timestamps to determine when to update one or more of the images included in the collection of images. For example, the system(s) may determine to update images after the period of time elapses, where the period of time may include one day, one week, one month, one year, and/or any other period of time. As such, when the system(s) determine that the period of time has elapsed, the system(s) may perform the processes described above (and/or any other retrieval process) to retrieve the image data representing new images depicting the item. The system(s) may then replace the image data representing the older image(s) with the image data representing the new image(s) within the collection of images.

Additionally, or alternatively, in some examples, such as when an item is new and/or the system(s) do not yet store a collection of images for the item, the event may be associated with the item being placed within the facility. For example, the system(s) may receive, from one or more computing devices, data indicating that the item has been placed within the facility. In some examples, the data may represent the identifier of the item, the identifier of the inventory location for which the item was placed, the location of the item within the facility, and/or any other information associated with the placement of the item within the facility. The system(s) may then use the data to determine that the item is either new to the facility and/or that the system(s) have yet to generate the collection of images for the item. As such, the system(s) may perform the processes described above (and/or any other retrieval process) to retrieve the image data representing the image(s) depicting the item within the facility. The system(s) may then store the image data as part of the collection of images for the item.

Additionally, or alternatively, in some examples, the event may be associated with the item being moved from a first inventory location within the facility to a second inventory location within the facility. For example, the system(s) may receive, from one or more computing devices, data indicating that the item has been moved within the facility. In some examples, the data may represent the identifier of the item, the identifier of the second inventory location for which the item was placed, the new location of the item within the facility, and/or any other information associated with the placement of the item within the facility. The system(s) may then use the data to determine that the item was moved within the facility. As such, the system(s) may perform the processes described above (and/or any other retrieval process) to retrieve the image data representing the image(s) depicting the item at the second inventory location. The system(s) may then store the image data as part of the collection of images for the item.

Additionally, or alternatively, in some examples, the event may be associated with an interaction of the item within the facility. For example, the system(s) may receive, from one or more computing devices, data indicating that the item has been interacted with within the facility. In some examples, the data may represent the identifier of the item, the type of interaction, the time of the interaction, and/or any other information associated with the interaction of the item. As described herein, the interaction may include, but is not limited to, an associate restocking the item at the inventory location, a customer returning the item to the inventory location, the associated and/or the customer rummaging through items at the inventory location, and/or any other type of interaction. The system(s) may then use the data to determine that the interaction occurred with the item. As such, the system(s) may perform the processes described above (and/or any other retrieval process) to retrieve the image data representing the image(s) depicting the item at the inventory location. The system(s) may then store the image data as part of the collection of images for the item.

Additionally, or alternatively, in some examples, the event may be associated with a state of the collection of images. For example, the system(s) may determine that the collection of images is in a first state when a number of images included in the collection of images is less than a first threshold. The system(s) may also determine that the collection of images is in a second state when the number of images included in the collection of images is between the first threshold and a second threshold. As described herein, the first state may include a critical state indicating that more images should be added to the collection of images while the second state includes a non-critical state indicating that the collection of images includes an adequate number of images. Additionally, as described herein, a threshold may include, but is not limited to, 10 images, 20 images, 25 images, 40 images, 50 images, 100 images, and/or any other number of images. As such, the system(s) may analyze the collection of images to determine that the collection of images is in the first state. Based on the determination, the system(s) may perform the processes described above (and/or any other retrieval process) to retrieve the image data representing the image(s) depicting the item at the inventory location. The system(s) may then store the image data as part of the collection of images for the item.

In some examples, such as when the system(s) identify multiple events for multiple items either at one facility or at multiple facilities, the system(s) may prioritize the retrieving of the image data for the items associated with the events. In some examples, the system(s) may prioritize the retrieving of the image data based on the types of events detected by the system(s). For example, the system(s) may determine a first type of event (e.g., a collection of images being in a critical state) includes first priority, a second type of event (e.g., a time period elapsing) includes a second priority that is less than the first priority, a third type of event (e.g., a user interacting with an item) includes a third priority that is less than the second priority, and/or so forth. The system(s) may then use the priorities when retrieving the image data. For example, the system(s) may retrieve the image data associated with item that includes the highest priority, followed by retrieving the image data associated with the item that includes the second highest priority, followed by retrieving the image data associated with the item that includes the third highest priority, and/or so forth.

In some examples, the system(s) may determine times when to retrieve the image data for the items. For example, and for a facility, the system(s) may receive data representing first times that the facility is open to customers and second times that the facility is closed to the customers. For instance, the data may indicate that the facility is open between 9:00 a.m. and 7:00 p.m. each day and closed at all other times. The system(s) may then use the data to determine when to retrieve the image data. For example, the system(s) may determine to retrieve the image data while the store is open to customers and determine not to retrieve the image data when the store is closed to customers. In some examples, the system(s) may determine to retrieve the image data when the store is open to customers since these times will provide better-quality images of the items For instance, an item may be located on an inventory location with lights, where the lights are turned on when the store is open (and/or when a user interacts with the inventory location) and are turned off when the store is closed (and/or when no user is interacting with the inventory location). As such, the system(s) may retrieve the image data when the lights are turned on in order to provide a better-quality image of the item.

In some examples, the system(s) (and/or other system(s)) may use the collections of images for the items for one or more purposes. For example, and as described in more detail below, different interactions may occur with an item at a facility. For instance, an associate may restock the item at an inventory location, a customer may remove the item from the inventory location, the customer may return the item to the inventory location, and/or the like. The system(s) may be configured to analyze data, such as image data representing these interactions, in order to determine the identity of the item. As such, to identify the item, the system(s) may analyze the image data representing the interaction using the collection of images in order to determine that the image data represents the item. Since the system(s) are performing this analysis using the collection of images associated with the item, the processing performed by the system(s) may output better results when the collection of images includes a sufficient amount of quality images that are updated to correctly depict the item.

As described herein, an identifier may include, but is not limited to, a numerical identifier, an alphabetic identifier, a mixed numerical and alphabetic identifier, and/or any other type of identifier that may be used to identify a facility, an inventory location, an item, an imaging device, and/or any other feature described herein. For example, an identifier may include a name, a code (e.g., a barcode, a Quick Response (QR) code, etc.), a number (a standard identification number), and/or any other type of identifier.

Although the techniques described herein are with reference to a session of a user in a materials handling facility, the techniques are generally applicable to any item-recognition environment. Other examples may include inventory-management systems automating the intake of new shipments of item inventory, libraries for processing returned books and/or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a flow diagram of an example process 100 for retrieving image data representing an inventory location, in accordance with examples of the present disclosure. At 102, the process 100 may include identifying imaging devices 104(1)-(3) (also referred to as "imaging devices 104") that include fields of view of an inventory location 106. For instance, the system(s) may identify the imaging devices 104 that include the FOVs of the inventory location 106. In some examples, to identify the imaging devices 104, the system(s) initially determine region(s) of the inventory location 106 that are accessible to one or more users, such as the user 108. In the example of FIG. 1, the system(s) may determine that just a front region 110 of the inventory location 106 is accessible to the user 108. Based on that determination, the system(s) may determine that an interested region for the inventory location 106 includes the front region 110. The system(s) may then identify the imaging devices 104 as including the FOVs of the front region 110. However, and as discussed in more detail with regard to FIGS. 3 and 4, the system(s) may use other techniques for identifying interested region(s) of other types of inventory locations.

At 112, the process 100 may include determining scores for the imaging devices 104 that are based on device visibilities 114(1)-(3) (also referred to as "device visibilities 114") of the inventory location 106. For instance, the system(s) may determine the scores for the imaging devices 104, where the scores are based on the device visibilities 114. For example, to determine the score for the imaging device 104(1), the system(s) may receive and/or generate visibility data representing a percentage of first pixels represented by image data that are associated with the inventory location 106 (e.g., the percentage of the first pixels that depict the inventory location 106), a percentage of the first pixels that are associated with one or more obstructing objects (e.g., the percentage of the first pixels that depict the object 116), a percentage second pixels represented by the image data that are associated with the front region 110 (e.g., the percentage of the second pixels that depict the front region 110), a percentage of the second pixels that are associated with one or more obstructing objects (e.g., the percentage of the second pixels that depict the object 116), a percentage of the inventory location 106 that is visible from the imaging device 104(1), a percentage of the front region 110 that is visible by the imaging device 104(1), an angle (e.g., an angle in the x-direction, an angle in the y-direction, and/or an angle in the z-direction) of the imaging device 104(1) with respect to the inventory location 106, and/or any other visibility information.

The system(s) may then use the visibility data to determine a score for the imaging device 104(1), which is described in more detail with respect to FIG. 5. The system(s) may then perform similar processes for each of the other imaging devices 104(2)-(3). In the example of FIG. 1, the system(s) may determine that the imaging device 104(2) includes the highest score (e.g., based on the device visibility 114(2)), the imaging device 104(1) includes the second highest score (e.g., based on the device visibility 114(1)), and the imaging device 104(3) includes the third highest score (e.g., based on the device visibility 114(3).

At 118, the process 100 may include determining whether the inventory location 106 is occluded from the imaging devices 104. For instance, and for the imaging device

104(1), the system(s) may receive and/or generate occlusion data representing a percentage of the image data that is occluded by the user 108, a percentage of the first pixels that are obstructed by the user 108, a percentage of the second pixels that are obstructed by the user 108, segmented portions of the image data that represent various portions of the user 108 (e.g., pixels that represents a head of the user 108, pixels that represent the arm of the user 108, pixels that represent the hand of the user 108, etc.), and/or any other information. The system(s) may then use one or more of the percentages above in order to select at least an image for the imaging device.

For example, the system(s) may compare the percentage to a threshold percentage in order to determine whether the percentage satisfies (e.g., is less than) the threshold percentage or does not satisfy (e.g., is equal to or greater than) the threshold percentage. As described herein, the threshold percentage may include, but is not limited to, 5%, 10%, 20%, and/or any other percentage. In some examples, when analyzing the image data, the system(s) may analyze the images of the video represented by the image data in temporal order and then select the first image that is associated with a percentage that satisfies the threshold percentage. In such examples, if the system(s) determine that none of the images within the video include a percentage that satisfies the threshold image, then the system(s) may determine to disregard the imaging device 104(1).

For instance, and in the example of FIG. 1, the system(s) may determine that a first percentage associated with a first image 120(1) generated by the imaging device 104(1) does not satisfy the threshold. As such, the system(s) may not select the first image 120(1). Additionally, the system(s) may determine that a second percentage associated with a second image 120(2) generated by the imaging device 104(1) also does not satisfy the threshold. As such, the system(s) may not select the second image 120(2). Furthermore, the system(s) may determine that a third percentage associated with a third image 120(3) generated by the imaging device 104(1) satisfies the threshold. As such, the system(s) may select the third image 120(3). The system(s) may then perform similar processes for each of the other imaging devices 104(2)-(3) (and/or each of the other imaging devices 104 that includes at least a threshold visibility score).

At 122, the process 100 may include selecting image data generated by one or more of the imaging devices 104. For instance, the system(s) may then select image data generated by one or more of the imaging devices 104 based on the scores associated with the device visibilities and the occlusion processing. In some examples, the system(s) may select the imaging device 104 that includes the highest score and a selected image, the two imaging devices 104 that include the two highest scores and selected images, the three imaging devices 104 that include the three highest scores and selected images, and/or so forth. Additionally, when selecting imaging devices 104 based on the scores, the system(s) may select the imaging devices 104 such that there is at least one imaging device that includes a FOV for each of the interested regions.

For instance, and in the example of FIG. 1, the system(s) may select the third image 120(3) based on the percentage satisfying the threshold and the score associated with the imaging device 104(1). The system(s) may also select an image 124 generated by the imaging device 104(2) based on a percentage associated with the image 124 satisfying the threshold and the score associated with the imaging device 104(2). However, the system(s) may determine not to select any image generated by the imaging device 104(3). In some examples, the system(s) may determine not to select any image generated by the imaging device 104(3) based on the score associated with the imaging device 104(3). For example, the score may not satisfy (e.g., may be less than) a threshold score. For another example, the system(s) may only select two of the imaging devices 104, where the imaging device 104(3) includes the lowest score from among the imaging devices 104. Additionally, or alternatively, in some examples, the system(s) may determine not to select any image generated by the imaging device 104(3) based on the obstruction data associated with the images generated by the imaging device 104(3). For example, none of the images may be associated with a percentage that satisfies the threshold.

In some examples, and as described in more detail below, the system(s) may then request the image data representing the third image 120(3) and the image data representing the image 124. Additionally, in some examples, the system(s) may crop and/or occlude pixels of the image data that depict the user 108. Furthermore, in some examples, the system(s) may crop the image data such that the image data represents the inventory location 106 and/or a specific item located at the inventory location 106. In any of the examples above, the system(s) may then store the image data in one or more data stores.

Figure 2:
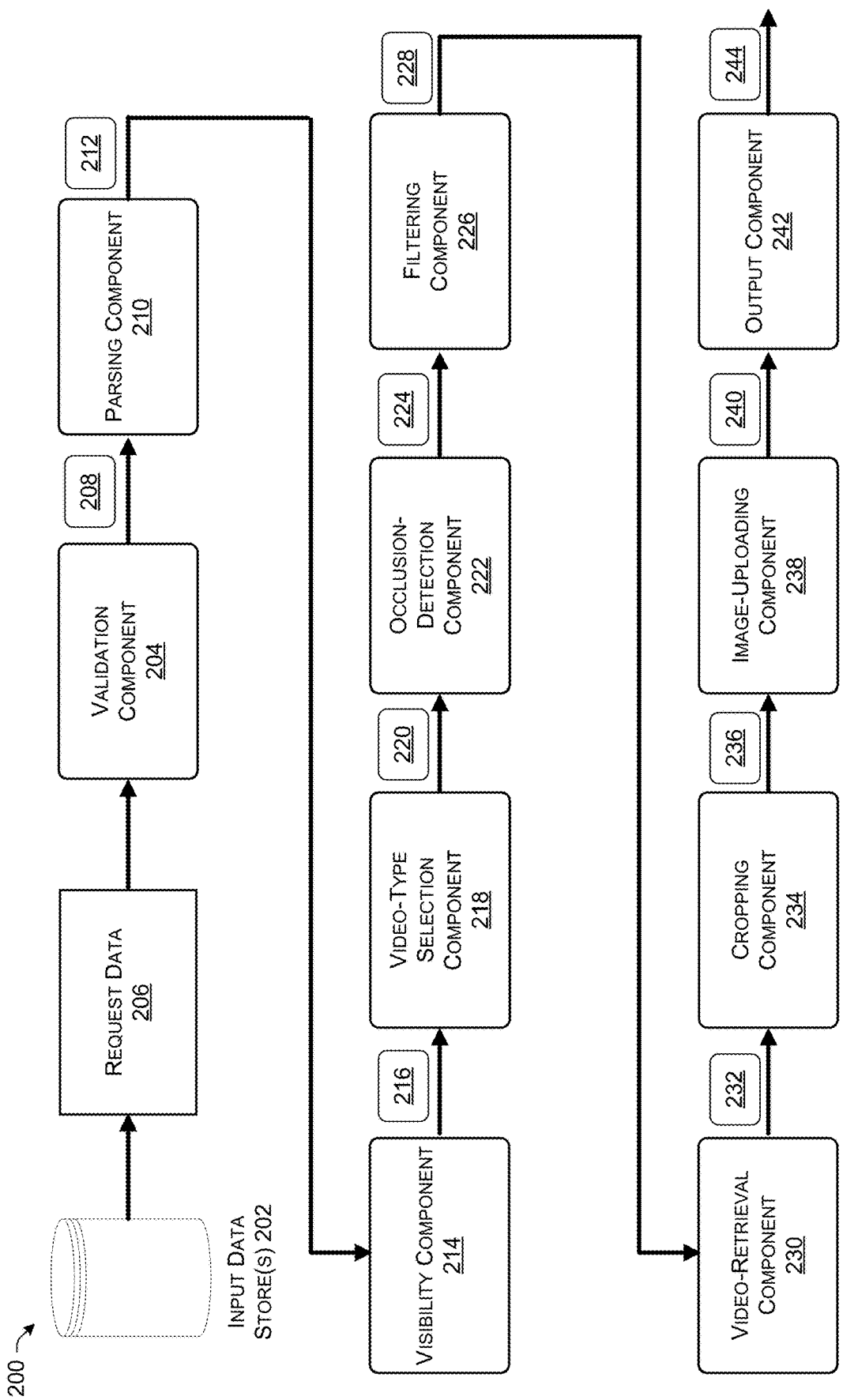
FIG. 2 illustrates an example process for retrieving image data representing an inventory location, in accordance with examples of the present disclosure.

While the example of FIG. 1 illustrates some of the processes for retrieving the image data, in other examples, the retrieving of the image data may include additional and/or alternative processes. For instance, FIG. 2 illustrates an example process 200 for retrieving the image data representing the inventory location, in accordance with examples of the present disclosure. As shown, input data store(s) 202 may store data representing requests for retrieving image data, where the requests are to retrieve image data representing inventory locations, items, areas within a facility, and/or the like. In some examples, the input data store(s) 202 may be associated with a queue that includes the requests. As described herein, a request may include, but is not limited to, an identifier of a facility, an identifier of an inventory location, an identifier of an item, a location associated with the inventory location within the facility, a location of the item within the facility, a time period for retrieving images, a priority, and/or any other information. In some examples, the system(s) may receive the data representing the requests from one or more computing devices (e.g., from a user requesting the images). In some examples, the system(s) may generate the data representing the requests based on detecting events.

A validation component 204 may then retrieve request data 206 representing a request and analyze the request data 206 in order to validate the request. In some examples, to validate the request, the validation component 204 may determine that the facility is valid (e.g., the facility exists), determine that the inventory location is valid (e.g., the inventory location is within the facility), determine that the item is valid (e.g., determine that the item is located within the facility and/or at the inventory location), determine that the time period is valid (e.g., determine that a length of the time period is within a threshold length, determine that the time period is during hours the facility is open, etc.), and/or perform one or more additional verification processes. Based on the validation component 204 verifying the request, the validation component 204 may then output the request data 206 and/or data 208 indicating that the request has been verified.

A parsing component 210 may convert the request into an internal task for processing. In some examples, the task may include at least some of the information from the request represented by the request data 206. The parsing component 210 may then output data 212 representing the task. The output of the data 212 may cause the following processes to occur for receiving image data.

Figure 3B:
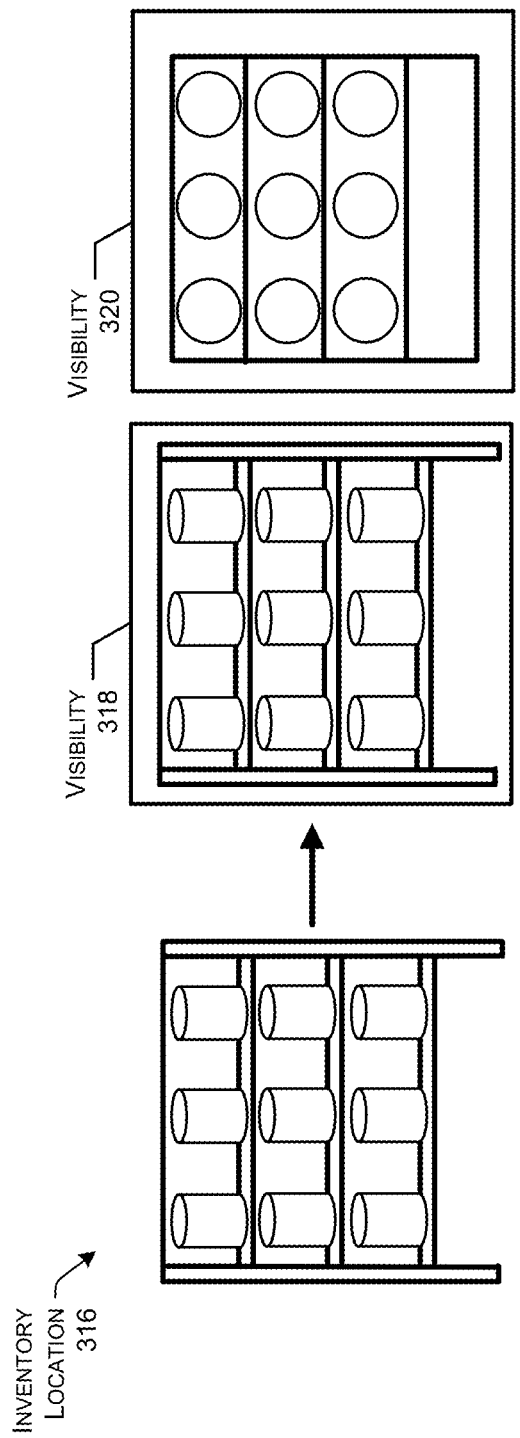

A visibility component 214 may be configured to determine scores for imaging devices. For instance, the visibility component 214 may initially determine region(s) of the inventory for requesting the images. For example, FIGS. 3A-3B illustrates examples of selecting regions of inventory locations, in accordance with examples of the present disclosure. As shown, the visibility component 214 may determine the region(s) for requesting the image data based on the type of inventory location that is indicated by the task.

In the examples of FIGS. 3A-3B, the visibility component 214 may determine the region(s) using data (which may be referred to as "feature data") representing the inventory locations. In some examples, the inventory locations are represented by cuboids. As such, the feature data may represent at least a volume of the merchandise within the inventory location, a volume of the inventory location, accessibility vectors associated with the inventory location, a location (e.g., coordinates) of the inventory location within the facility, locations (e.g., coordinates) of the regions associated with the inventory location, and/or any other information. In some examples, the accessibility vectors indicate the accessible region(s) of the inventory location.

For a first example of determining the region(s), and for a first type of inventory location 302, the inventory location 302 may include six regions. As shown, the regions include a front region 304(1), a first side region 304(2), a second side region 304(3), a back region 304(4), a top region 304(5), and a bottom region (not show). Additionally, and for the inventory location 302, the visibility component 214 may use the feature data associated with the inventory location 302 in order to determine that the inventory location 302 includes only one accessible region, which is the front region 304(1) shaded in grey. In some examples, since the only accessible region is the front region 304(1), the visibility component 214 may determine that the only interested region is the front region 304(1). This may be because views of the other regions of the inventory location 302 may not provide much information about interactions between users and items associated with the inventory location 302. As such, the visibility component 214 may request imaging devices that include a visibility 306 of the front region 304(1) of the inventory location 302.

For a second example, and for a second type of inventory location 308, the inventory location 308 may also include six regions. As shown, the six regions include a first side region 310(1), a second side region 310(2), a third side region 310(3), a fourth side region 310(4), a top region 310(5), and a bottom region (not shown). Additionally, and for the inventory location 308, the visibility component 214 may use the feature data associated with the inventory location 308 to determine that the inventory location 308 also includes only one accessible region, which is the top region 310(5) shaded in grey. In some examples, since the only accessible region is the top region 310(5), the visibility component 214 may determine that the interested regions include the top region 310(5) and at least a side region 310(1)-(4). This may be because interactions between users and items associated with the inventory location 308 may be analyzed from both the top of the inventory location 308 and the sides of the inventory location 308.

In some examples, and as at least partially illustrated in FIG. 3A, the visibility component 214 may determine to pick the side region 310(1)-(4) that includes the largest surface area. For instance, the visibility component 214 may determine a first surface area of the first side region 310(1), a second surface area of the second side region 310(2), a third surface area of the third side region 310(3), and a fourth surface area of the fourth side region 310(4). The visibility component 214 may then select the side region 310(1)-(4) that includes the largest surface area. In the example of FIG. 3A, based on the type of the inventory location 308, the visibility component 214 may determine that all of the surface areas for all of the side regions 310(1)-(4) are equal to one another. As such, the visibility component 214 may just pick any one of the side regions 310(1)-(4), such as the first side region 310(1). Because of this, the visibility component 214 may request imaging devices that include a visibility 312 of the top region 310(5) and a visibility 314 of the first side region 310(1).

Still, for a third example, and for a third type of inventory location 316, the inventory location 316 may again include six regions. As shown in more detail in the example of FIG. 4, the six regions include a front region 402(1), a first side region 402(2), a second side region 402(3), a back region 402(4), a top region 402(5), and a bottom region 402(6). Additionally, and for the inventory location 316, the visibility component 214 may use the feature data associated with the inventory location 316 to determine that the inventory location 316 includes multiple accessible regions, such as the front region 402(1) and the top region 402(5) shaded in grey. In some examples, the visibility component 214 may also determine that the accessible regions include the first side region 402(2) and the second side region 402(3). In some examples, since there are multiple accessible regions, the visibility component 214 may determine that there are also multiple interested regions associated with the inventory location 316.

In some examples, the visibility component 214 may determine that the interested regions include each of the accessible regions of the inventory location 316. For instance, the visibility component 214 may determine that the interested regions include the front region 402(1), the top region 402(5), the first side region 402(2), and/or the second side region 402(3). In some examples, the visibility component 214 may determine the interest regions based on the areas of the accessible regions. For instance, the visibility component 214 may determine a first area associated with the front region 402(1) represented in grey, determine a second area associated with the top region 402(5) represented in grey, determine a third area associated with the first side region 402(2) represented in grey, and determine a fourth area associated with the second side region 402(3) (which may be the same as the third area for the inventory location 316). In some examples, the visibility component 214 may then select at least one of the front region 402(1), the first side region 402(2), and the second side region 402(3). Additionally, the visibility component 214 may select the top region 402(5) if the second area associated with the top region 402(5) is larger than the largest area between the first area associated with the front region 402(1), the third area associated with the first side region 402(2), and the fourth area associated with the second side region 402(3).

After determining the interested regions, and as illustrated again in the example of FIG. 3B, the visibility component 214 may request imaging devices that include a visibility 318 of the front region 402(1) and a visibility 320 of the top region 402(5).

Figure 4:
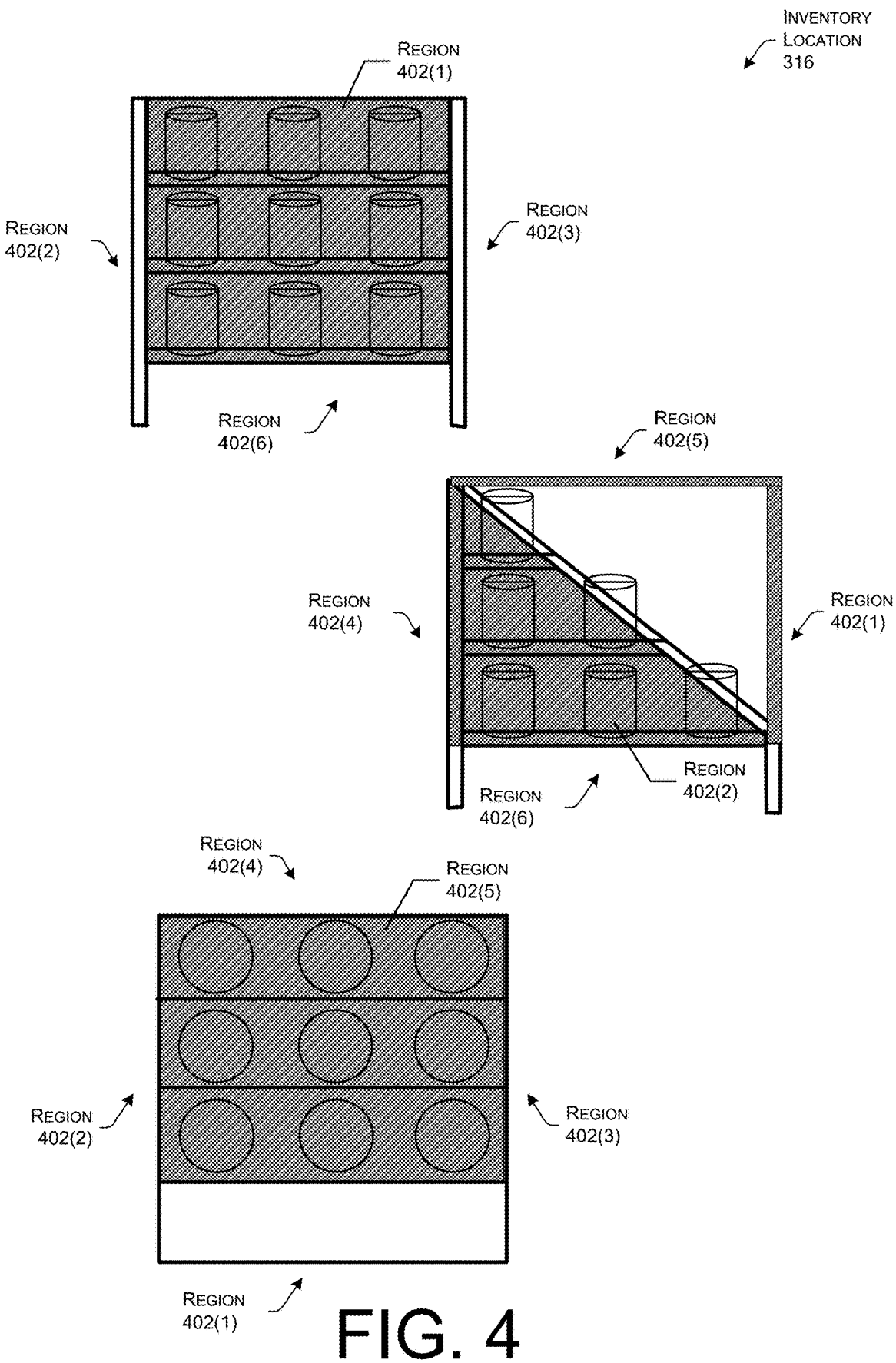
FIG. 4 illustrates examples of selecting regions of inventory locations, in accordance with examples of the present disclosure.

In some examples, and as illustrated in FIGS. 3A-4, the system(s) represent the inventory locations as cuboids. As such, the request may include, but is not limited to, an identifier of the inventory location, identifier(s) of the interested region(s), a location (e.g., the coordinates) within the facility for which the inventory location is located, location(s) (e.g., the coordinates) of the interested region(s), and/or any other information that may help to determine the imaging devices. For example, the request for the inventory location 316 may include, but is not limited to, an identifier of the inventory location 316, an identifier of the front region 402(1), an identifier of the top region 402(5), a location (e.g., the coordinates) within the facility for which the inventory location 316 is located, a location (e.g., the coordinates) of the front region 402(1), a location (e.g., the coordinates) of the top region 402(5), and/or any other information that may help to determine the imaging devices.

While the example of FIGS. 3A-3B illustrate three examples of determining accessible regions and interested regions for three different types of inventory locations, in other examples, the visibility component 214 may perform similar and/or alternative techniques to determine accessible regions and/or interested regions for other types of inventory locations. Additionally, the visibility component 214 may then generate a request for the imaging devices based on the interested regions. The request may include at least the identifier of the facility, the identifier of the inventory location, the identifier of an item, the interested region(s), the location of the facility associated with the inventory location, and/or any other information. Additionally, based on sending the request, the visibility component 214 may receive data that identifies the imaging devices.

The visibility component 214 may then be configured to determine the visibility scores for the imaging devices. For instance, FIG. 5 illustrates an example of determining a visibility score for an imaging device 502, in accordance with examples of the present disclosure. As shown, and for the visibility 318 of the imaging device 502, the visibility component 214 may receive and/or generate visibility data representing a percentage of first pixels represented by image data that are associated with the inventory location 316 (which is represented by a dark grey shading 504), a percentage of the first pixels that are associated with an obstructing object 506 (e.g., which is represented by a light grey shading 508), a percentage of second pixels represented by the image data that are associated with the front region 402(1) (which is again represented by the dark grey shading 504), a percentage of the second pixels that are associated with the obstructing object 506 (e.g., which is again represented by the light grey shading 508), a percentage of the inventory location 316 that is visible from the imaging device 502, a percentage of the front region 402(1) that is visible by the imaging device 502, an angle 510 (e.g., an angle in the x-direction, an angle in the y-direction, and/or an angle in the z-direction) of the imaging device 502 with respect to the inventory location 316, and/or any other visibility information.

The visibility component 214 may then use the visibility data to determine the score for the imaging device 502. For a first example, if the visibility data indicates that an entirety of the inventory location 316 is occluded, then the visibility component 214 may determine that the score for the imaging device 502 is zero. For a second example, if the visibility data indicates that a clipped portion of the inventory location 316 satisfies a threshold, then the visibility component 214 may again determine that the score for the imaging device 502 is zero. For a third example, if the visibility component 214 determines that the percentage of the second pixels that are associated with the obstructing object 506 satisfy (e.g., is equal to or greater than) a threshold, then the visibility component 214 may again determine that the score for the imaging device 502 is zero. While these are just a couple examples techniques for determining a score of zero, in other examples, the visibility component 214 may use additional and/or alternative techniques.

In some examples, the visibility component 214 may determine the score using one or more of the percentages and/or the angle above. When determining the score using such a technique, the visibility component 214 may provide weight(s) to one or more of the percentages and/or the angle. For example, the visibility component 214 may determine the score by multiplying the percentage of the first pixels by a first weight, plus adding the percentage of the first pixels that are not obstructed multiplied by a second weight, plus adding the percentage of the second pixels multiplied by a third weight, plus adding the percentage of the second pixels that are not obstructed multiplied by a fourth score, plus adding an initial score for the angle multiplied by a fifth score. While this is just one example algorithm that the visibility component 214 may use to determine the score, in other examples, the visibility component 214 may use additional and/or alternative algorithms.

The visibility component 214 may then output data 216 representing the scores for the imaging devices. In some examples, the data 216 may represent a list of the imaging devices, where the list is ordered based on the scores. For example, the imaging device with the highest score may be first on the list, the imaging device with the second highest score may be second on the list, the imaging device with the third highest score may be third on the list, and/or so forth. In some examples, the list may include a threshold number of the imaging devices with the highest scores. In such examples, the threshold number may include, but is not limited to, one imaging device, two imaging devices, three imaging devices, ten imaging devices, and/or any other number of imaging devices. Additionally, or alternatively, in some examples, the list may not include imaging devices that are associated with scores that do not satisfy (e.g., are less than) a threshold score. For example, the list may not include imaging devices with a score of zero.

A video-type selection (STS) component 218 may then determine types of image data that are associated with the imaging devices represented by the data 216 that is output from the visibility component 214. In some examples, the types of image data may be based on a quality of the videos. For examples, the types of image data associated with the imaging devices may include, but are not limited to, a first type of image data that includes a first resolution (e.g., low-resolution video), a second type of image data that includes a second resolution (e.g., high-resolution video), and/or the like. In some examples, an imaging device may only be associated with a single type of image data while in other examples, an imaging device may be associated with multiple types of images data. The output from the STS component 218 may include data 220 representing the type(s) of image data that are associated with the imaging devices included in the data 216.

An occlusion-detection component 222 may be configured to determine an occlusion associated with the image data generated by the imaging devices. For instance, and for each of the imaging devices, the occlusion detection component 222 may receive and/or generate occlusion data representing a percentage of the image data that is occluded by one or more users (e.g., the percentage of the pixels that represent the user(s)), a percentage of the first pixels that are obstructed by the user(s) (e.g., the percentage of the inventory location that is obstructed by the user(s) within the image), a percentage of the second pixel(s) that are obstructed by the user(s) (e.g., the percentage of the interested region(s) that are obstructed by the user(s) within the image), segmented portions of the image data that represent various portions of the user(s) (e.g., pixels that represents a head of a user, pixels that represent the arm of the user, pixels that represent the hand of the user, etc.), and/or any other information. The system(s) may then use one or more of the percentages above in order to select at least an image for the imaging device.

Figure 6:
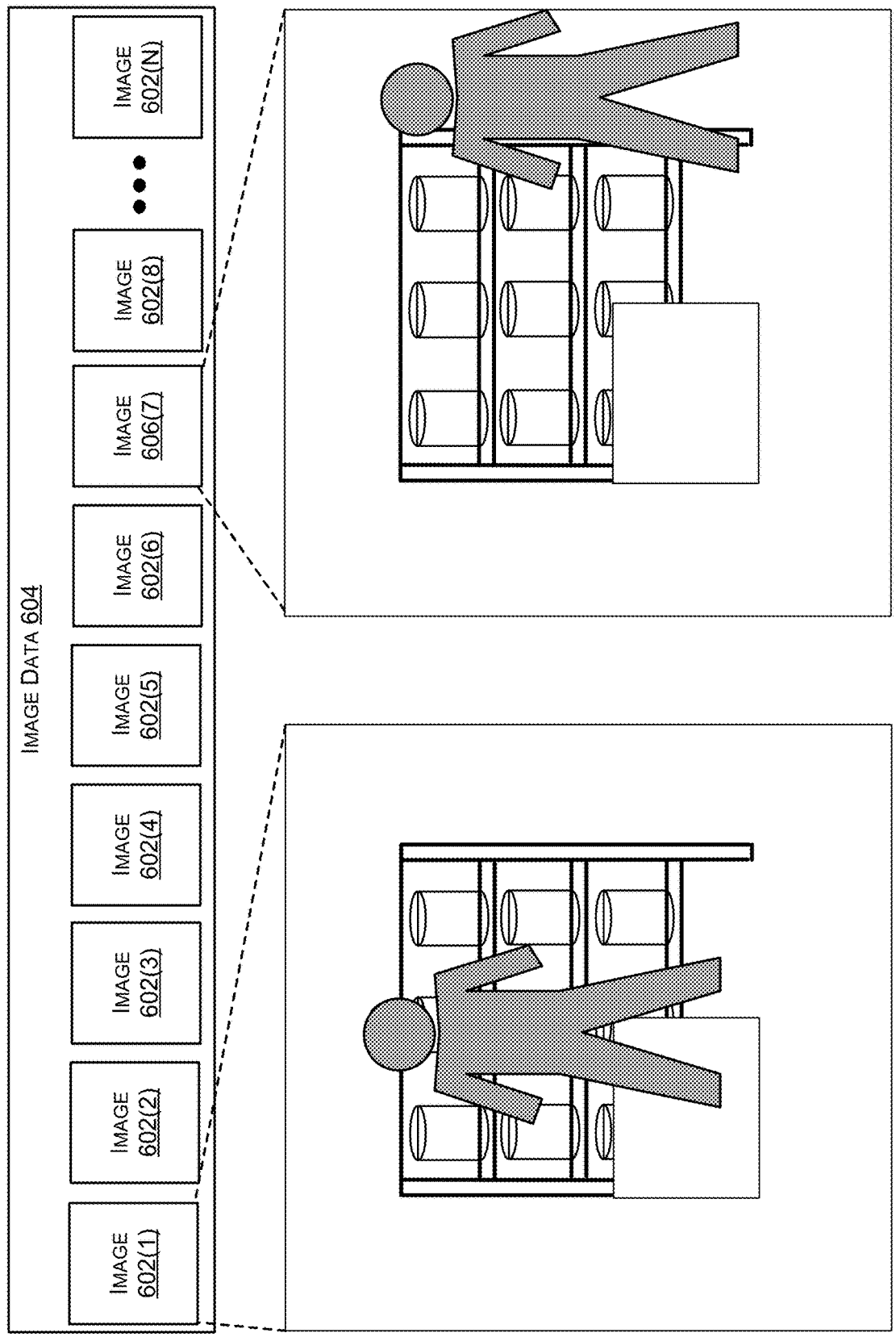
FIG. 6 illustrates an example of determining occlusions associated with images and then selecting an image based on the occlusions, in accordance with examples of the present disclosure.

For instance, FIG. 6 illustrates an example of determining occlusions associated with images 602(1)-(N) (also referred to as "images 602") and then selecting an image 602 based on the occlusions, in accordance with examples of the present disclosure. In some examples, the occlusion-detection component 222 may receive occlusion data associated with image data 604, where the image data 604 represents the images 602 (e.g., frames) of a video. In other examples, the occlusion-detection component 222 may receive the image data 604. In such examples, the occlusion-detection component 222 may then analyze the image data 604 (e.g., analyze the images 602 of the video) in order to generate the occlusion data. In either of the examples, the occlusion-detection component 222 may use the occlusion data to pick at least one of the images 602 of the video.

For example, the occlusion-detection component 222 may begin to analyze the occlusion data representing the images 602 in temporal order starting with the first image 602(1) of the video. As shown, the occlusion data associated with the first image 602(1) of the video may represent a percentage of the pixels of the first image 602(1) that are occluded by a user, where the pixels are represented with grey shading. In some examples, the percentage is associated with an entirety of the first image 602(1) while in other examples, the percentage is only associated with the pixels of the inventory location (and/or the interested region) that are obstructed by the user. In either of the examples, the occlusion-detection component 222 may compare the percentage to a threshold percentage in order to determine whether the percentage satisfies (e.g., is less than) the threshold percentage or does not satisfy (e.g., is equal to or greater than) the threshold percentage. As described herein, the threshold percentage may include, but is not limited to, 5%, 10%, 20%, and/or any other percentage.

In the example of FIG. 6, the occlusion-detection component 222 may determine that the percentage for the first image 602(1) does not satisfy the threshold percentage. As such, the occlusion-detection component 222 may determine not to select the first image 602(1). Because of this, the occlusion-detection component 222 may use similar processes in order to analyze the occlusion data associated with the next image of the video, which is the second image 602(2). Again, based on the analysis, the occlusion-detection component 222 may determine that the percentage associated with the second image 602(2) does not satisfy the threshold percentage and, as such, the occlusion-detection component 222 may determine not to select the second image 602(2). The occlusion-detection component 222 may continue this process through the rest of the images 602(3)-(N) until the occlusion-detection component 222 identifies an image 602 for selection.

For instance, and in the example of FIG. 6, the occlusion-detection component 222 may analyze the occlusion data associated with the seventh image 602(7). Based on the analysis, the occlusion-detection component 222 may determine that the percentage associated with the seventh image 602(7) satisfies the threshold percentage. As such, the occlusion-detection component 222 may select the seventh image 602(7) from the video. In some examples, the occlusion-detection component 222 may be configured to select a single image 602 from the video and, as such, the occlusion-detection component 222 may stop analyzing the rest of the images 602(8)-(N). However, in other examples, the occlusion-detection component 222 may be configured to continue analyzing the rest of images 602(8)-(N) in order to attempt to selected one or more of the remaining images 602(8)-(N).

Additionally, the occlusion-detection component 222 may be configured to perform similar processes for each of the other imaging devices. In some examples, if the occlusion-detection component 222 determines that an entirety of a video for an imaging device does not include an image that is associated with a percentage that satisfies the threshold percentage, then the occlusion-detection component 222 may discard the imaging device (e.g., determine not to use the imaging device). Returning back to the example of FIG. 2, the occlusion-detection component 222 may then output data 224 representing information about the selected information. The information for a selected image may include at least an identifier of the imaging device that generated the selected image and a timestamp of when the imaging device generated the selected image.

A filtering component 226 may then be configured to select imaging devices that are associated with selected images (e.g., imaging devices that were not discarded), where the filtering component 226 selects the imaging devices based on the scores. For example, the filtering component 226 may select the imaging device that includes the highest score and a selected image, the two imaging devices that include the two highest scores and selected images, the three imaging devices that include the three highest scores and the selected images, and/or so forth. Additionally, when selecting imaging devices based on the scores, the filtering component 226 may select the imaging devices such that there is at least one imaging device that includes a FOV for each of the interested regions.

For example, FIG. 7 illustrates an example of filtering imaging devices based on scores, in accordance with examples of the present disclosure. As shown, a list 702 may include identifiers for the imaging devices 704(1)-(6) (also referred to as "imaging devices 704"), the scores 706(1)-(6) (also referred to as "scores 706") for the imaging devices 704, the regions 708(1)-(2) (also referred to as "regions 708") associated with the imaging devices 704, and whether the imaging devices 704 are associated with selected images 710(1)-(5) (also referred to as "images 710"). In the example of FIG. 7, the filtering component 226 may determine to select three of the imaging devices 704, where at least one of the selected imaging devices 704 must of a FOV of the first region 708(1) and at least one of the selected imaging devices 704 must have a FOV of the second region 708(2).

As such, and going down the list 702, the filtering component 226 may initially select the first imaging device 704(1) since the first imaging device 704(1) includes the highest score 706(1), includes the FOV of the first region 708(1), and is associated with the selected image 710(1). The filtering component 226 may then continue down the list 702 in order to select the second imaging device 704(2) since the second imaging device 704(2) includes the second highest score 706(2), includes the FOV of the first region 708(1), and is associated with the selected image 710(2).

Next, the filtering component 226 may determine not to select the third imaging device 704(3) even though the third imaging device 704(3) has the third highest score 706(3) and includes the FOV of the second region 708(2). This is because the third imaging device 704(3) is not associated with a selected image. Additionally, the filtering component 226 may determine not to select the fourth imaging device 704(4) even though the fourth imaging device 704(4) has the fourth highest score 706(4) and is associated with a selected image 710(3). This is because the fourth imaging device 704(4) includes the FOV of the first region 708(1) and the filtering component 226 needs to select at least one imaging device 704 that includes the FOV of the second region 708(2).

Rather, the filtering component 226 may select the fifth imaging device 704(5) since the fifth imaging device 704(5) includes the fifth highest score 706(5), includes the FOV of the second region 708(2), and is associated with the selected image 710(4). In some examples, since the filtering component 226 has now selected the three imaging devices 704(1), 704(2), and 704(5), the filtering component 226 may refrain from analyzing the rest of the list 702. Returning back to the example of FIG. 2, the filtering component 226 may then output data 228 representing information about the selected imaging devices. The information for a selected imaging device may include at least an identifier of the imaging device and a timestamp of when the imaging device generated a selected image.

A video-retrieval component 230 may then retrieve the image data representing the videos for the imaging devices selected by the filtering component 226. In some examples, to retrieve the image data, the video-retrieval component 230 may generate data representing a request, where the request includes at least identifiers of the imaging devices and timestamps indicating starting positions and stopping positions for each of the videos. The video-retrieval component 230 may then send the data to one or more computing devices and, based on sending the data, receive the image data from the one or more computing devices. The video-retrieval component 230 may then output data 232 representing the retrieved image data.

A cropping component 234 may then be configured to crop the videos represented by the retrieved image data. For instance, and for image data (also referred to as "video data") representing a video, the cropping component 234 may be configured to analyze the image data in order to identify a portion of the image data representing the selected image from the video. In some examples, the cropping component 234 identifies portion of the image data representing the selected image using a timestamp associated with the image. The cropping component 234 may then perform one or more additional processing techniques on the image data.

Figure 8:
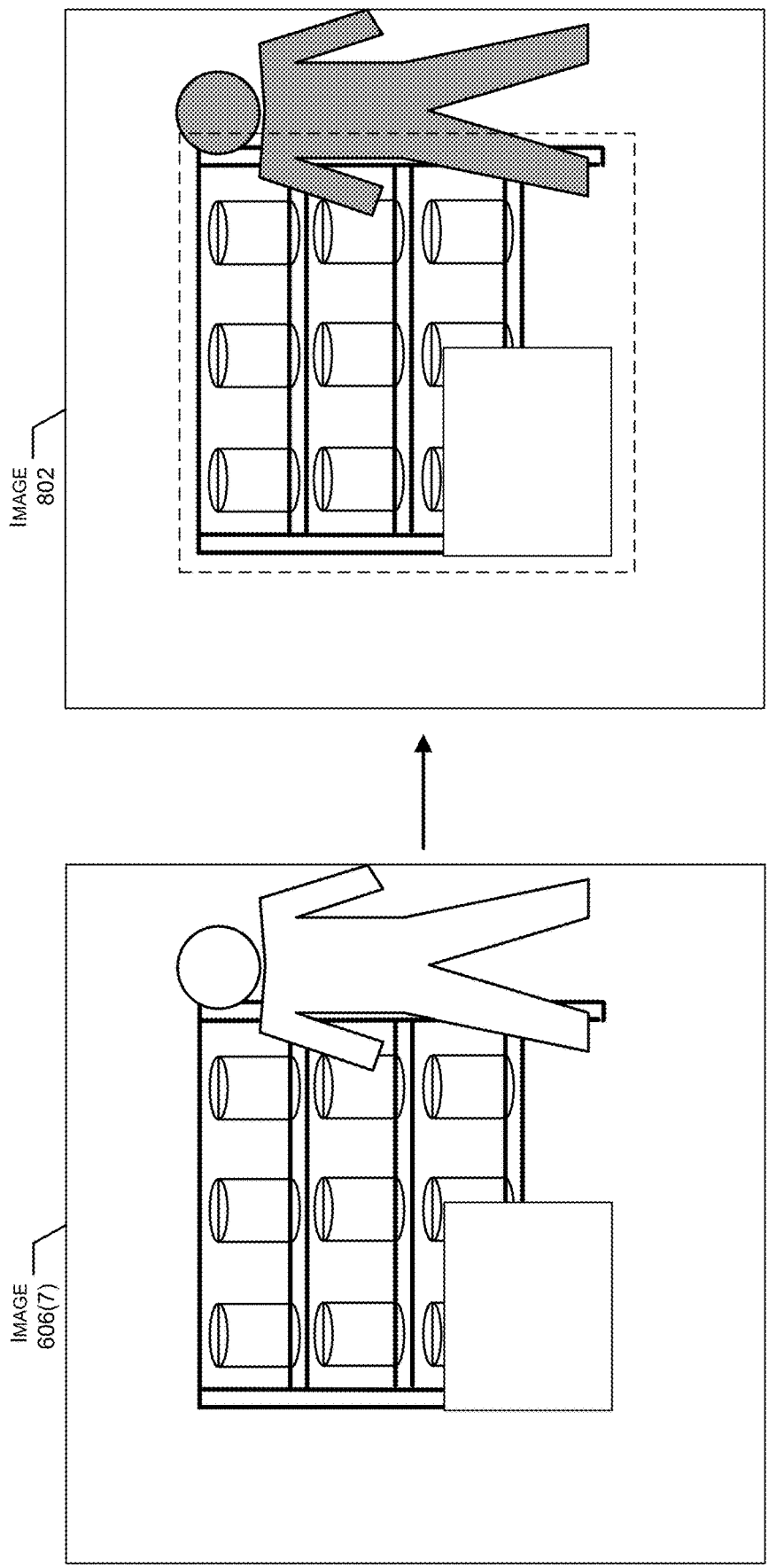
FIG. 8 illustrates an example of processing image data representing an image, in accordance with examples of the present disclosure.

For instance, FIG. 8 illustrates an example of processing image data representing the image 606(7) selected with respect to the example of FIG. 6, in accordance with examples of the present disclosure. As shown, in some examples, the cropping component 234 may process the image data by occluding the user (and/or a portion of the user, such as the face of the user) that is depicted by the image 606(7). In some examples, the cropping component 234 occludes the user by changing the pixels represented by the user (and/or the portion of the user), such as by shading the pixels represented by the user (which is illustrated in the example of FIG. 8). Additionally, or alternatively, in some examples, the cropping component 234 occludes the user (and/or the portion of the user) by removing at least the portion of the image 606(7) that depicts the user. In either of the examples, the cropping component 234 may occlude the user (and/or the portion of the user) in order to prevent a processed image 802 from including any information that may be used to identify the user using the processed image 802.

In some examples, the cropping component 234 may further process the image data representing the image 602(7) by cropping the image 602(7) to depict one or more specific features. The one or more specific features may include, but are not limited to, the inventory location, item(s) located on the inventory location, item(s) being interacted with by the user, and/or any other feature. For instance, and as illustrated by the dashed box included in the processed image 802, the cropping component 234 may crop the image 602(7) to only include the inventory location.

In some examples, the cropping component 234 may perform similar processes for the image data representing each of the remaining videos retrieved by the video-retrieval component 230. Returning to the example of FIG. 2, after processing the image data, the cropping component 234 may output processed image data 236 representing the processed images.

An image uploading-component 238 may then upload the image data 236 representing the images to one or more data stores. In some examples, the image-uploading component 238 may also receive and/or generate a mechanism, such as a link, an address, and/or the like, for retrieving the image data 236 from the data store(s). Additionally, in some examples, the image-uploading component 238 may then output data 240 representing the mechanism along with an indication that the task associated with the request has been completed. Next, an output component 242 may generate data 244 representing a response to the request. In some examples, the response may include at least an indication that the task is complete, an indication that the image data 236 has been uploaded to the data store(s) and is ready to retrieve, the mechanism for retrieving the image data 236, and/or any other information. Additionally, in some examples, the output component 242 may send the data 244 representing the response to one or more computing devices that initially provided the request.

While the example of FIG. 2 illustrates ten different components performing the processes described above, in other examples, one or more of the components may be combined in a single component. Additionally, in some examples, at least one of the components may be separated into two or more components that are configured to perform the processes described above for the component.

Figure 9:
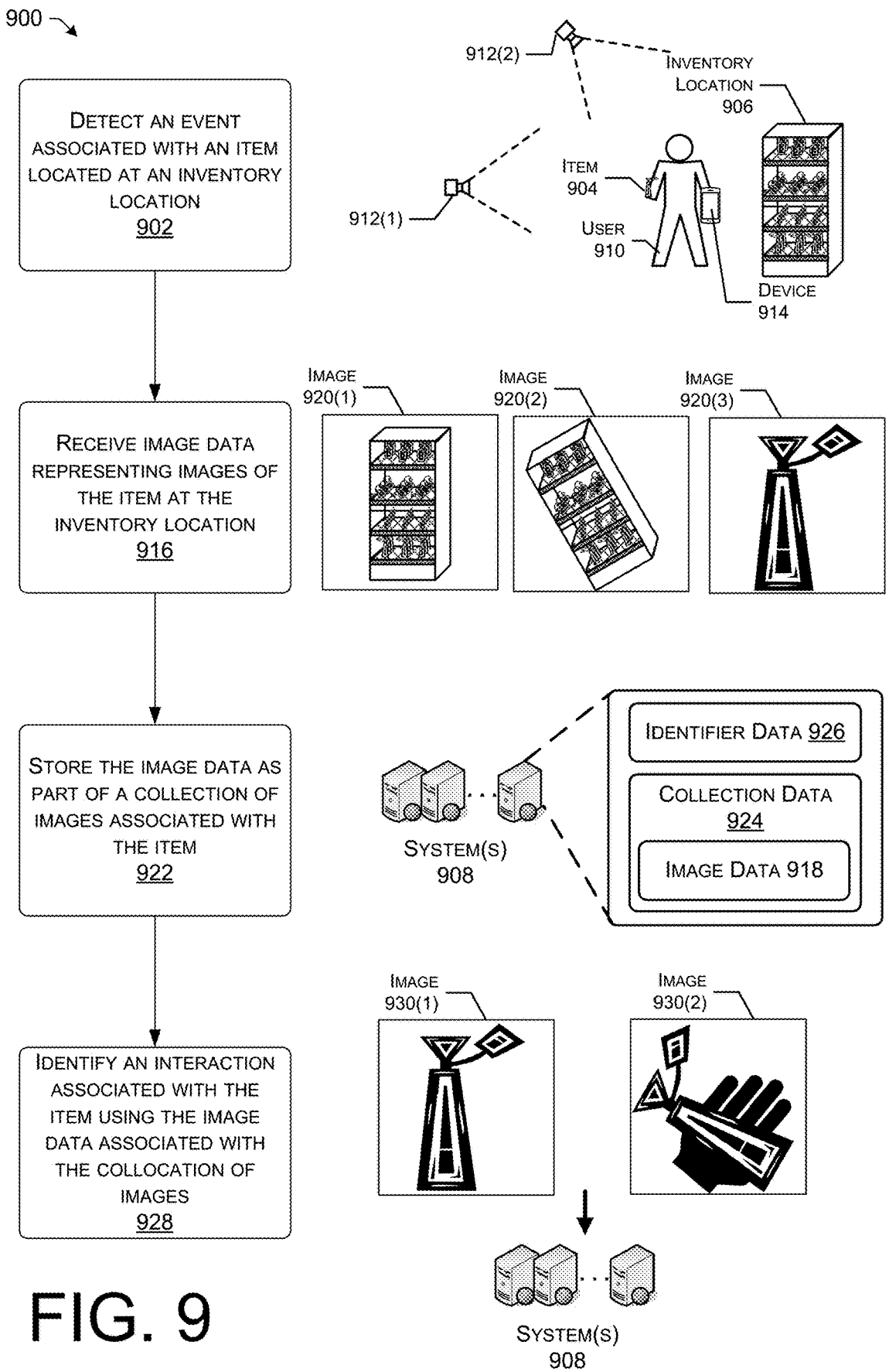
FIG. 9 illustrates a flow diagram of an example process for detecting an event and then, based on detecting the event, updating a collection of images, in accordance with examples of the present disclosure.

As described herein, the system(s) may determine to update a collection of images, such as by performing the processes described with respect to FIGS. 1-8, based on detecting an event. As such, FIG. 9 illustrates a flow diagram of an example process 900 for detecting an event and then, based on detecting the event, updating a collection of images, in accordance with examples of the present disclosure. At 902, the process 900 may include detecting an event associated with an item 904 located at an inventory location 906. For instance, system(s) 908 may detect the event associated with the item 904. In the example of FIG. 9, the event may include a user 910 interacting with the item 904 at the inventory location 906.

For a first example, if the user 910 is a customer, the system(s) 908 may detect the event by analyzing image data generated by imaging devices 912(1)-912(2) (also referred to as "imaging devices 912"). Based on the analysis, the system(s) 908 may determine that the image data represents the user 910 removing the item 904 from the inventory location 906, returning the item 904 to the inventory location 906, and/or rummaging through the items at the inventory location 906. For a second example, if the user 910 is an associate of the facility, the system(s) 908 may detect the event by again analyzing image data generated by imaging devices 912. Based on the analysis, the system(s) 908 may determine that the image data represents the user 910 restocking the item 904 at the inventory location 906. Still, for a third example, the system(s) may detect the event by receiving, from a device 914 associated with the user 910, data indicating that the event occurred (e.g., the device 914 may scan the item 904, such as a barcode of the item 904, and then send the data to the system(s) 908). For example, the data may indicate that the user 910 restocked the item 904 at the inventory location 906.

While these are just a couple examples of events that may be detected, in other examples, the system(s) 908 may detect the event using additional and/or alternative techniques. For a first example, the system(s) 908 may detect the event based on a period of time elapsing. For instance, the system(s) 908 may store information about the images included in the collection of images for the item 904, such as timestamps indicating when the image data representing the images was generated. The system(s) 908 may then use the timestamps to determine when to update one or more of the images included in the collection of images. For instance, the system(s) 908 may determine to update images after the period of time has elapsed, where the period of time may include one day, one week, one month, one year, and/or any other period of time. As such, when the system(s) 908 determine that the period of time has elapsed, the system(s) 908 may detect the event.

For a second example, the system(s) 908 may detect the event based on a current state of the collection of images. For instance, the system(s) 908 may determine that the collection of images is in a first state when a number of images included in the collection of images is less than a first threshold. The system(s) 908 may also determine that the collection of images is in a second state when the number of images included in the collection of images is greater than the first threshold (and/or between the first threshold and a second threshold). As described herein, the first state may include a critical state indicating that more images should be added to the collection of images while the second state includes a non-critical state indicating that the collection of images includes an adequate number of images. Additionally, as described herein, a threshold may include, but is not limited to, 10 images, 20 images, 25 images, 40 images, 50 images, 100 images, and/or any other number of images. As such, the system(s) 908 may analyze the collection of images to determine that the collection of images is in the first state. Based on the determination, the system(s) may detect that the event has occurred.

In some examples, the collection of images may be in the first state for one or more reasons. For a first example, the collection of images may be in the first state based on the item including a new item, either at the facility or at all facilities. As such, the system(s) 908 may not have received and/or collected enough images yet for the collection of images. For a second examples, the system(s) 908 may automatically removed older images, such as images that were captured and/or collected longer than a threshold period of time ago. This may also cause the number of images within the collection of images to be in the first state. Still, for a third examples, the collection of images may be in the first state based on the system(s) 908 raising the first threshold, such as to make sure that there is an adequate number of images in the collections of images. While these are just a few example reasons of why the collection of images may be in the first state, in other examples, the collection of images may be in the first state for other reasons.

At 916, the process 900 may include receiving image data 918 representing images 920(1)-(3) (also referred to as "images 920") of the item 904 at the inventory location 906. For instance, based on detecting the event, the system(s) 908 may cause the imaging devices 912 to generate and/or send the image data 918. In some examples, the system(s) 908 cause the imaging devices 912 to generate and/or send the image data 918 by sending data to the imaging devices 912, where the data represents a command to generate and/or send the image data 918. In some examples, the system(s) 908 may perform one or more of the processes described with respect to FIGS. 1-8 in order to cause the imaging devices 912 to generate and/or send the image data 918. For instance, the system(s) 908 may perform the processes above to identify and/or score the imaging devices 912, determine that the image data 918 is not obstructed, crop the image data 918, obstruct the user 910 represented by the image data 918, and/or perform one or more other processes described above. While the example of FIG. 9 only illustrates that the image data 918 represents three different images 920, in other examples, the image data 918 may represent any number of images 920.

In some examples, such as when the system(s) 908 identify multiple events for multiple items, either at one facility or multiple facilities, the system(s) 908 may prioritize the retrieving of the image data for the items associated with the events. In some examples, the system(s) 908 may prioritize the retrieving of the image data based on the types of events detected by the system(s) 908. For example, the system(s) 908 may determine a first type of event (e.g., a collection of images being in a critical state) includes a first priority, a second type of event (e.g., a time period elapsing) includes a second priority that is less than the first priority, a third type of event (e.g., a user interacting with an item) includes a third priority that is less than the second priority, and/or so forth.

Additionally, or alternatively, in some examples, the system(s) 908 may prioritize the retrieving of the image data based on the qualities of images included in the collection of images. For example, the system(s) 908 may determine that low quality images include a first priority, medium quality images include a second priority that is less than the first priority, good quality images include a third priority that is less than the second priority, and/or so forth. In some examples, the system(s) 908 determine the quality for an image based on the visibility data, the obstruction data, the type of event that caused the generating of the image, and/or using one or more additional and/or alternative techniques. The system(s) 908 may then use the priorities when retrieving the image data. For example, the system(s) 908 may retrieve the image data associated with item that includes the highest priority, followed by retrieving the image data associated with the item that includes the second highest priority, followed by retrieving the image data associated with the item that includes the third highest priority, and/or so forth.

At 922, the process 900 may include storing the image data 918 as part of a collection of images associated with the item 904. For instance, the system(s) 908 may store the image data 918 as part of the collection of images, where the collection of images is represented by collection data 924. In some examples, the collection of images is associated with the item 904 by associating the collection data 924 with identifier data 926 associated with the item 904. For instance, the identifier data 926 may represent a name of the item 904, a code (e.g., a barcode, a Quick Response (QR) code, etc.) of the item 904, a number (a standard identification number) associated with the item 904, and/or any other type of data that may be used to identify the item 904. When storing the image data 918, the system(s) 908 may use one or more different techniques.

For example, the system(s) 908 may determine a number of images that are currently included in the collection of images. If the system(s) 908 determine that the number of images does not satisfy (e.g., is less than) the second threshold, then the system(s) 908 may store all of the images 920 (e.g., all of the image data 918) in association with the collection of images as long as the number of images remains below the second threshold. However, if the number of images satisfies (e.g., is equal to or greater than) the second threshold, then the system(s) 908 may replace images already included in the collection of images with the new images 920. In some examples, the system(s) 908 replace the images based on when the images were generated. For example, the system(s) 908 may use the timestamps to replace the oldest images included in the collection of images. For instance, and in the example of FIG. 9, if the system(s) 908 need to replace three images with the three new images 920, then the system(s) 908 may remove the three oldest images from the collection of images. The system(s) 908 may then store the image data 918 representing the three new images 920 in association with the collection of images.

Additionally, or alternatively, in some examples, the system(s) 908 may perform additional techniques to replace the images included in the collection of images. For instance, certain types of images may improve the processing that the system(s) 908 later perform when using the collection of images to detect interactions associated with the item 904. For a first example, images that depict the item 904 after an associate restocks the item 904 (e.g., when the inventory location 906 is in a tidy state) may be better for later processing than images that depict the item 904 after numerous users have interacted with the items at the inventory location 906 (e.g., when the inventory location 906 is in an untidy state). For a second example, images that depict the item 904 during hours when the facility is open (e.g., when the lighting is adequate) may be better for later processing than images that depict the item 904 during hours when the facility is closed (e.g., when the lighting is not adequate). As such, the system(s) 908 may use these determinations when replacing images included in the collection of images.

Figure 11:
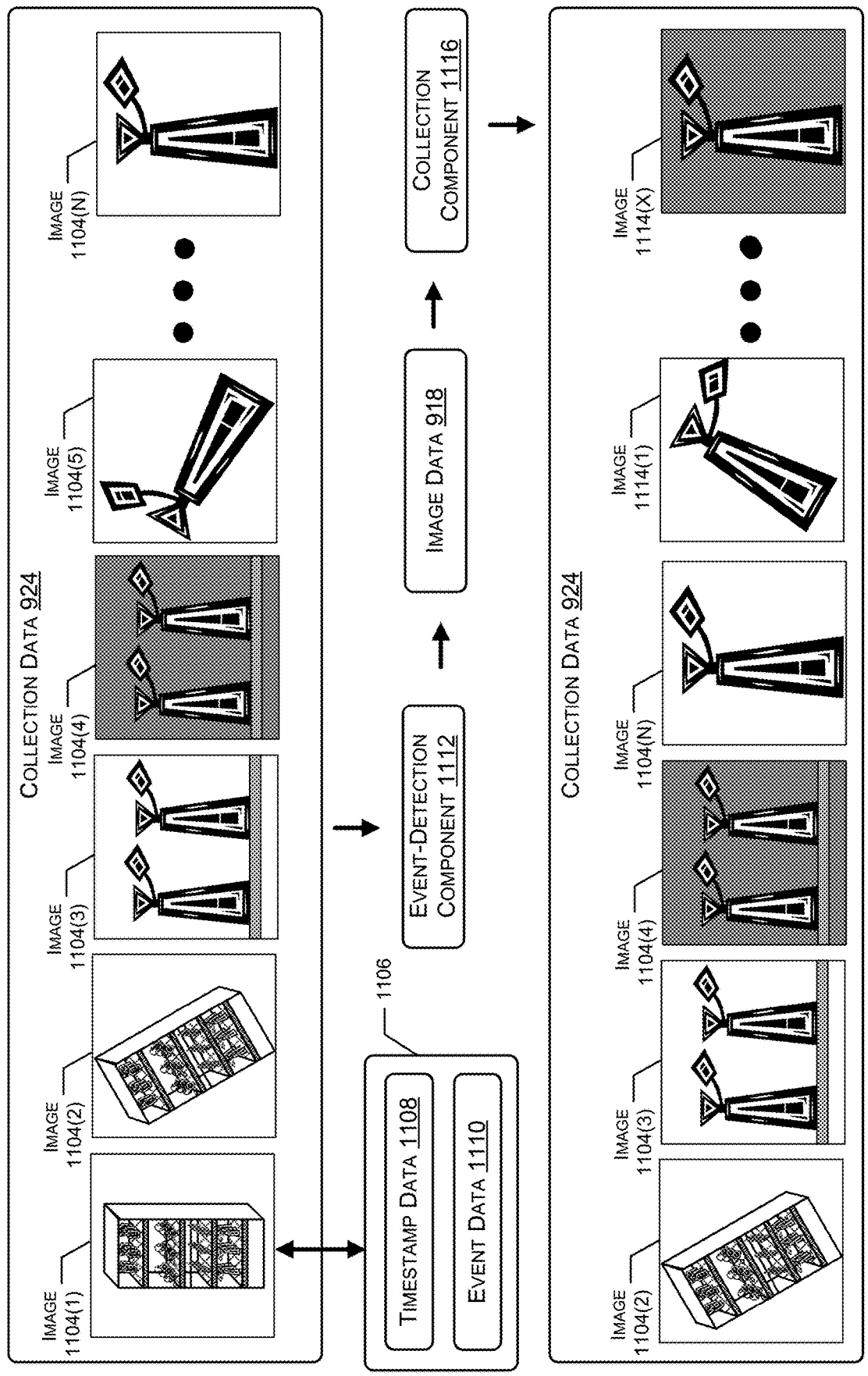
FIG. 11 illustrates an example of updating a collection of images associated with an item, in accordance with examples of the present disclosure.

For a first example, and again if the system(s) 908 need to replace three images from the collection of images, the system(s) 908 may analyze the images to identify three images that were generated while the inventory location 906 was in an untidy state. The system(s) 908 may then remove those three identified images from the collection of images. Additionally, the system(s) 908 may store the image data 918 representing the three new images 920 in association with the collection of images. For a second example, and again if the system(s) 908 need to replace three images from the collection of images, the system(s) 908 may analyze the images to identify three images that were generated while the facility was closed. The system(s) 908 may then remove those three identified images from the collection of images. Additionally, the system(s) 908 may store the image data 918 representing the three new images 920 in association with the collection of images. Examples of replacing images included in a collection of images is illustrated in the example of FIG. 11.

At 928, the process 900 may include identifying an interaction associated with the item 904 using the image data 918 associated with the collection of images. For instance, the system(s) 908 may later receive image data representing a new images 930(1) depicting the item 904 on the inventory location 906 and/or a new image 930(2) depicting a user interacting with the item 904. As such, the system(s) 908 may analyze the image data representing the images 930(1)-(2) with respect to the image data 918 representing the images 920. Based on the analysis, the system(s) 908 may determine that the interaction is with the item 904. For example, based on the analysis, the system(s) 908 may determine that the images 930(1)-(2) depict the item 904.

As discussed in the example process 900, the system(s) 908 may determine priorities for items when detecting events that trigger the generating and/or updating of collections of images. For instance, FIG. 10 illustrates an example of prioritizing items when collecting image data for collections of images, in accordance with examples of the present disclosure. As shown, the system(s) 908 may generate priority data 1002 for various items. The priority data 1002 may include, but is not limited to, item identifiers 1004(1)-(6) (also referred to as "item identifiers 1004"), event types 1006(1)-(6) (also referred to as "event types 1006"), locations 1008(1)-(6) (also referred to as "locations 1008"), times 1010(1)-(6) (also referred to as "times 1010"), and priorities 1012(1)-(6) (also referred to as "priorities 1012"). However, in other examples, the priority data 1002 may not include one or more of the event types 1006, the locations 1008, or the times 1010. Additionally, in other examples, the priority data 1002 may include additional information about the items.

The item identifiers 1004 may represent identifiers for the items included in the list. As described herein, the identifier for an item may represent a name of the item, a code (e.g., a barcode, a Quick Response (QR) code, etc.) of the item, a number (a standard identification number) associated with the item, and/or any other type of identifier that may be used to identify the item. The event types 1006 may represent the types of events that caused the items to be placed on the list for retrieving new images for the collections of images. As described herein, the event type for an item may include a period of time elapsing since generating previous images, an interaction with the item at an inventory location (e.g., a restocking of the item, a returning of the item, a rummaging through items, etc.), an indication that the item is new at the facility and/or an inventory location, an indication that the item has moved from to a new inventory location, a state associated with the collection of images, and/or any other type of event.

The locations 1008 of the items may include the facilities that the items are located, the inventory locations within the facilities that the items are located, the locations (e.g., coordinates, such as x-coordinates, y-coordinates, z-coordinates) within the facilities that the items are located, and/or any other location information that may be used to determine where the items are located. Additionally, the times 1010 may represent times that the facilities are open, times that the facilities are closed, times when the image data should be collected, and/or any other timing information. Furthermore, the priorities 1012 may represent the priorities for when to collect the image data. For example, a first item associated with the item identifier 1004(1) may include the highest priority 1012(1), a second item associated with the item identifier 1004(2) may include the second highest priority 1012(2), a third item associated with the item identifier 1004(3) may include the third highest priority 1012(3), and/or so forth.

As such, and in the example of FIG. 10, the system(s) 908 may initially generate and/or update the collocation of images of the first item based on the priority 1012(1), the system(s) 908 may then generate and/or update the collection of images of the second item based on the priority 1012(2), the system(s) 908 may then generate and/or update the collection of images of the third item based on the priority 1012(3), and/or so forth. However, in some examples, the system(s) 908 may use the times 1010, in addition to the priorities 1012, when selecting the order for the items. For instance, the system(s) 908 may determine to update the collection of images for items when the facilities associated with the items are open. For example, if a facility that includes the first item associated with the item identifier 1004(1) is closed, but a facility that includes the second item associated with the item identifier 1004(2) is open, then the system(s) 908 may generate and/or update the collection of images associated with the second item before generating and/or updating the collection of images associated with the first item.

FIG. 11 illustrates an example of updating a collection of images associated with an item, in accordance with examples of the present disclosure. In the example of FIG. 11, the collection of images, which is represented by the collection data 924, may initially include a first number of images 1104(1)-(N) (also referred to as "images 1104"). As shown, each image 1104 may be associated with additional information 1106 that the system(s) 908 may use when updating the collection of images 1102 (although only the additional information 1106 for the first image 1104(1) is shown for clarity reasons). In the example of FIG. 11, the additional information 1106 may include at least timestamp data 1108 representing timestamps of when the images 1104 were generated and event data 1110 representing events that caused the generating of the images 1104. However, in other examples, the additional information 1106 may include any other type of information associated with the images 1104.

An event-detection component 1112 of the system(s) 908 may perform one or more of the processes described herein in order to detect an event associated with updating the collection of images. As such, the system(s) 908 may receive image data 918 representing at least new images 1114(1)-(X) (also referred to as "images 1114"). A collection component 1116 of the system(s) 908 may then perform one or more of the processes described herein in order to update the collection of images using the image data 918. For a first example, the collection component 1116 may initially determine to replace the image 1104(1) with a new image 1114(1) since the image 1104(1) includes the oldest image from the collection of images. In some examples, the collection component 1116 determines that the image 1104(1) includes the oldest image based on the timestamp data 1108 associated with the images 1104.

For a second example, the collection component 1116 may determine to replace the image 1104(5) with a new image 1114(X) based on the event data 1110 associated with the images 1104. For example, the event data 1110 may indicate that the image 1104(5) was generated after multiple users had rummaged through items located an inventory location associated with the item (e.g., the inventory location was untidy), but that the other images 1104(2)-(4) and 1104(N) were generated after associates restocked the items at the inventory location (e.g., the inventory location was tidy). As such, the collection component 1116 may determine that the image 1104(5) is less reliable when performing processing than the other images 1104(2)-(4) and 1104(N) included in the collection of images. Because of this, the collection component 1116 may replace the image 1104(5) even though each of the images 1104(2)-(4) is older than the image 1104(5).

While the example of FIG. 11 describes replacing some of the original images 1104 included in the collection of images, in other examples, the collection component 1116 may not replace any of the images 1104, but may just add the images 1114 to the collection of images. For example, the collection component 1116 may determine that the original number of images included in the collection of images does not satisfy (e.g., is below) the second threshold, which is discussed herein. As such, as long as the total number of images included in the collection of images, even when the new images 1114 are added, still does not satisfy the second threshold, then the collection component 1116 may add the images 1114 to the collection of images.

While the examples of FIGS. 9-11 describe the system(s) 908 as updating a single collection of images for a single item using image data representing images depicting the item, in other examples, the system(s) 908 may update collections of images for multiple items using the image data. For example, and as illustrated at least in the examples of FIGS. 9 and 11, one or more of the images may depict both the item and another item also located at an inventory location. As such, the system(s) 908 may use the image data representing those image(s) to update both the collection of images associated with the item and the collection of images associated with the other item. This may help improve the processing performed by the system(s) 908, as the system(s) 908 are able to update collections of images associated with multiple items with only retrieving the image data a single time from the imaging device(s) and/or one or more data stores.

Figure 12:
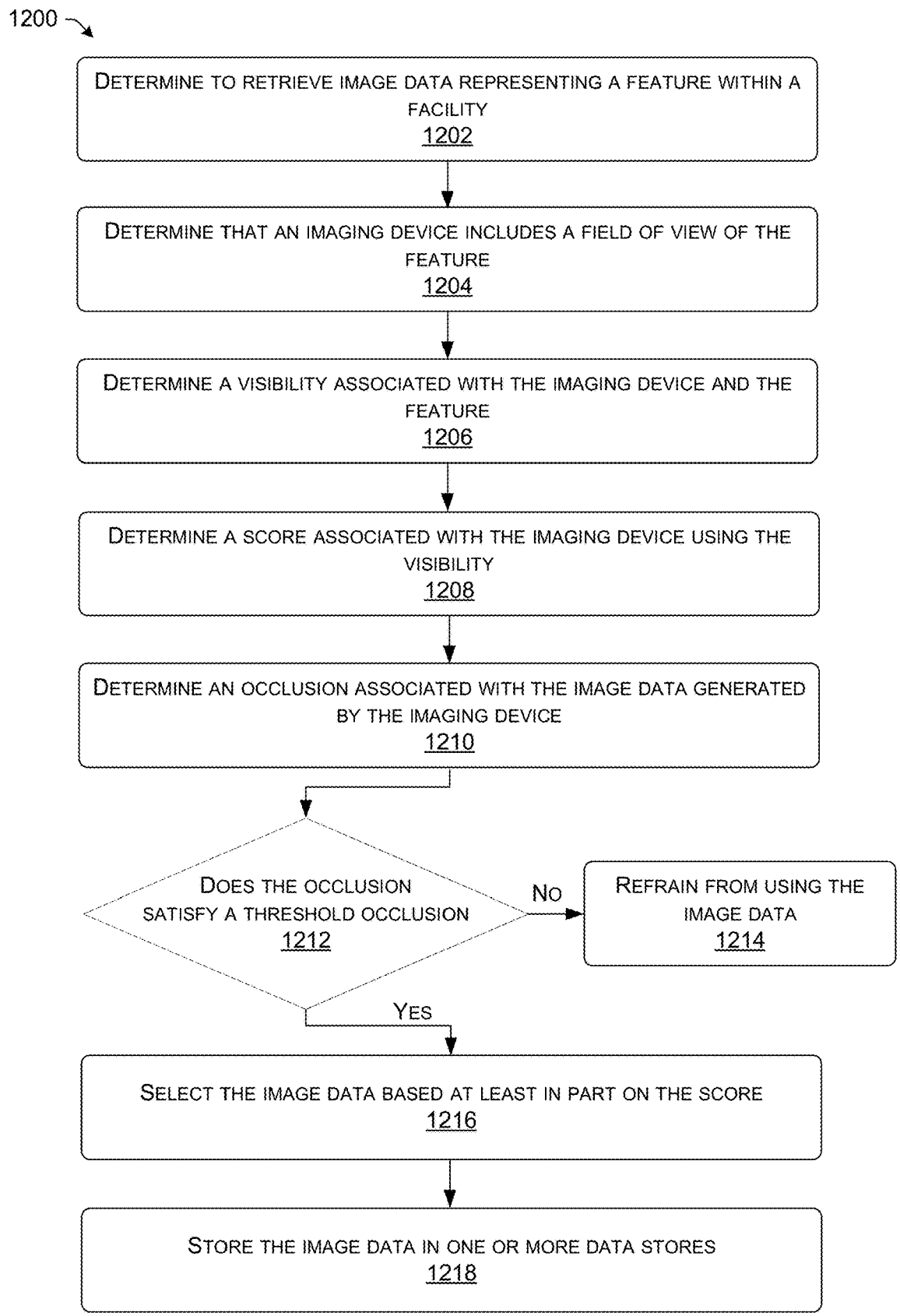
FIG. 12 illustrates a flow diagram of an example process for retrieving image data representing an area within a facility, in accordance with examples of the present disclosure.
Figure 13:
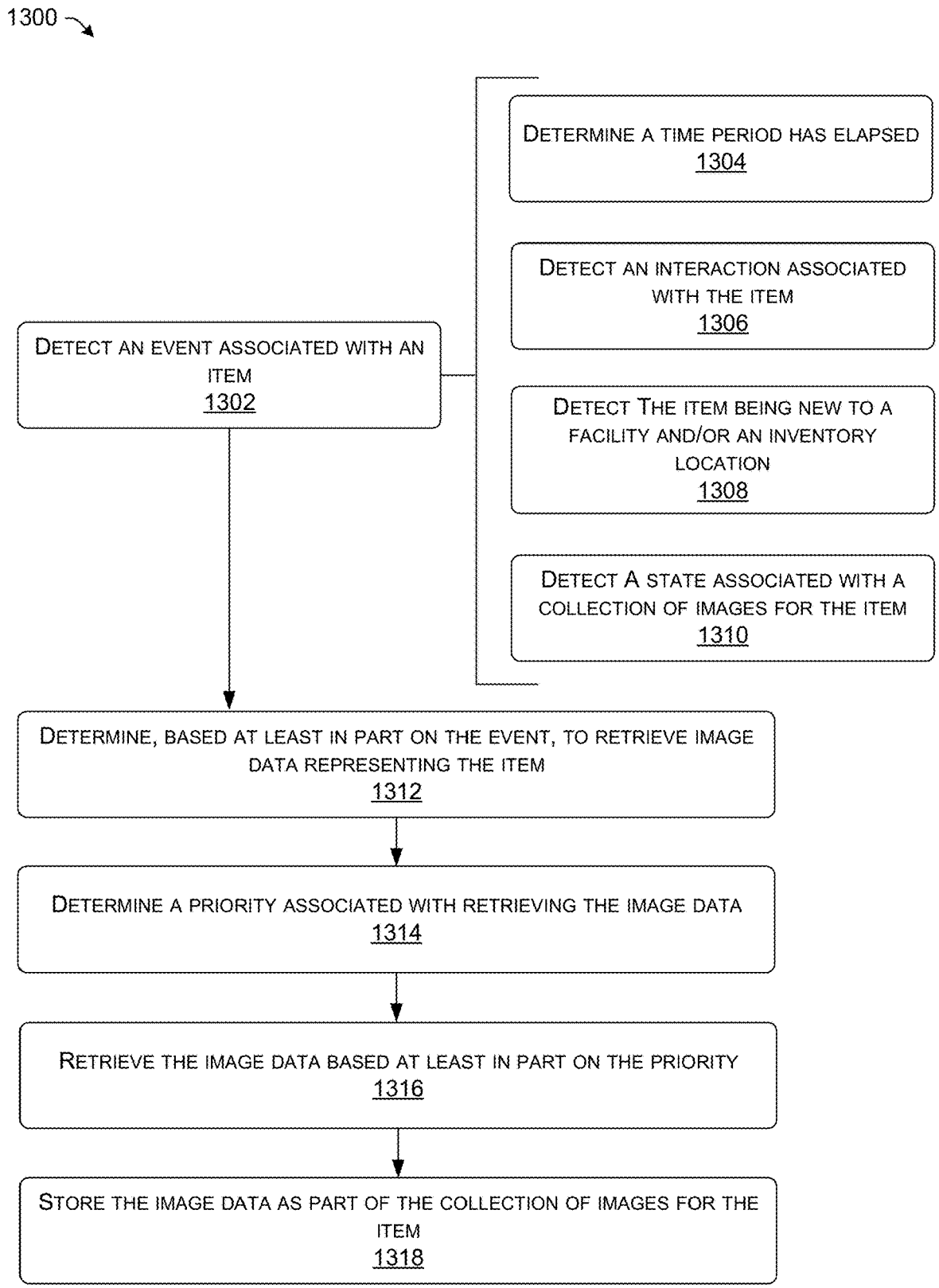
FIG. 13 illustrates a flow diagram of an example process for generating and/or updating a collection of images associated with an item, in accordance with examples of the present disclosure.

FIGS. 12-13 illustrate various processes for detecting events and retrieving image data representing features within a facility. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 12 illustrates a flow diagram of an example process 1200 for retrieving image data representing an area within a facility, in accordance with examples of the present disclosure. At 1202, the process 1200 may include determining to retrieve image data representing a feature within a facility. For instance, the system(s) 908 may determine to retrieve the image data. As described herein, in some examples, the system(s) 908 determine to retrieve the image data based on detecting the occurrence of an event. Additionally, or alternatively, in some examples, the system(s) 908 determine to retrieve the image data based on receiving a request for the image data, where the request includes information about the feature. For example, the request may include an identifier of the facility, an identifier of the feature, a location associated with the feature, a time period for the image data, and/or any other information. The feature may include an inventory location, region(s) of the inventory location, an item, a location within the facility, and/or any other feature associated with the facility.

At 1204, the process 1200 may include determining that an imaging device includes a field of view of the feature. For instance, the system(s) 908 may determine that the imaging device includes the FOV of the feature. For example, such as when the feature includes the inventory location, the system(s) 908 may initially determine accessible region(s) of the inventory location. In some examples, the system(s) 908 make the determination based on the type of the inventory location (e.g., a basket, a table, a shelf, a counter, a refrigerator, etc.), which is described in detail herein. The system(s) 908 may then use the accessible region(s) to determine interested region(s) of the inventory location. After identifying the interested region(s), the system(s) may use the interested region(s) to identify the imaging device that includes the FOV representing the identified region(s). In some examples, the system(s) 908 may perform similar processes in order to identify additional imaging device(s).

At 1206, the process 1200 may include determining a visibility associated with the imaging device and the feature. For instance, the system(s) 908 may receive and/or generate visibility data representing the visibility associated with the imaging device. As described herein, the visibility data may represent a percentage of first pixels represented by image data that are associated with the feature, a percentage of the first pixels that are associated one or more obstructing objects, a percentage second pixels represented by the image data that are associated with the interested region(s), a percentage of the second pixels that are associated with one or more obstructing objects, a percentage of the feature that is visible from the imaging device, a percentage of the interested region(s) that are visible by the imaging device, an angle (e.g., an angle in the x-direction, an angle in the y-direction, and/or an angle in the z-direction) of the imaging device with respect to the feature, and/or any other visibility information.

At 1208, the process 1200 may include determining a score associated with the imaging device using the visibility. For instance, the system(s) 908 may be configured to determine the score for the imaging device based on the visibility data, using one or more of the processes described herein. Additionally, when the system(s) 908 are analyzing more than one imaging device, the system(s) 908 may be configured to determines score(s) for each of the other imaging device(s) using visibility data associated with the other imaging device(s). In some examples, the system(s) 908 may then generate list data representing a list for the imaging devices, where the list is ordered based on the scores. For example, the imaging device with the highest score may be first, the imaging device with the second highest score may be second, the imaging device with the third highest score may be third, and/or so forth.

At 1210, the process 1200 may include determining an occlusion associated with the image data generated by the imaging device. For instance, the system(s) 908 may receive and/or generate occlusion data associated with the imaging device. As described herein, the occlusion data may represent a percentage of the image data that is occluded by one or more users (e.g., the percentage of the pixels that represent the user(s)), a percentage of the first pixels that are obstructed by the user(s) (e.g., the percentage of the feature that is obstructed by the user(s) within the image), a percentage of the second pixel(s) that are obstructed by the user(s) (e.g., the percentage of the interested region(s) that are obstructed by the user(s) within the image), segmented portions of the image data that represent various portions of the user(s) (e.g., pixels that represents a head of a user, pixels that represent the arm of the user, pixels that represent the hand of the user, etc.), and/or any other information. The system(s) may then use one or more of the percentages above in order to select at least an image for the imaging device.

At 1212, the process 1200 may include determining whether the occlusion satisfies a threshold occlusion. For instance, the system(s) 908 may determine whether the occlusion satisfies the threshold occlusion. In some examples, the system(s) may make the determination by comparing at least one of the percentages to a threshold percentage in order to determine whether the at least one percentage satisfies (e.g., is less than) the threshold percentage or does not satisfy (e.g., is equal to or greater than) the threshold percentage. As described herein, the threshold percentage may include, but is not limited to, 5%, 10%, 20%, and/or any other percentage. If it is determined that the occlusion does not satisfy the threshold occlusion, then at 1214, the process 1200 may include refraining from using the image data. For instance, if the system(s) 908 determine that the occlusion does not satisfy the threshold occlusion, then the system(s) 908 may refrain from using the image data. Additionally, in some examples, the system(s) 908 may perform similar processes as 1210-1212 to determine whether additional image data generated by the imaging devices is associated with an occlusion that satisfies the threshold occlusion.

However, it is determined that the occlusion satisfies the threshold occlusion, then at 1216, the process 1200 may include selecting the image data based at least in part on the score. For instance, if the system(s) 908 determine that the occlusion satisfies the threshold occlusion, then the system(s) 908 may select the image data based at least in part on the score. For example, the system(s) 908 may select the imaging devices that are associated with a top number of scores (e.g., the top two scores, the top three scores, the top ten scores, and/or any other number of scores). Additionally, in some examples, the system(s) 908 may use additional techniques when selecting the image data. For example, the system(s) 908 may select the image data such that there is at least one image that depicts each of the interested region(s) of the inventory location.

At 1218, the process 1200 may include storing the image data in one or more data stores. For instance, the system(s) 908 may retrieve the image data, such as from one or more computing devices. In some examples, the system(s) 908 retrieve the image data by generating and then sending data representing a request, where the request indicates at least the identifier associated with the imaging device and the timestamp associated with the selected image data. Additionally, in some examples, the system(s) 908 may generate a notification indicating that the image data is stored in the one or more data stores. The notification may include a link, an address, and/or any other mechanism for accessing the image data. The system(s) may then send the notification to one or more computing devices associated with the original request that started the process.

FIG. 13 illustrates a flow diagram of an example process 1300 for generating and/or updating a collection of images associated with an item. At 1302, the process 1300 may include detecting an event associated with an item. For instance, the system(s) 908 may detect the event associated with the item. As shown, and at 1304, the system(s) 908 may detect the event by determining that a time period has elapsed. For instance, the system(s) 908 may analyze data associated with a collection of images for the item, where the data indicates at least timestamps of when the images included in the collection of images were generated and/or stored. The system(s) 908 may then analyze the timestamps in order to determine that the time period has elapsed since generating and/or storing at least a portion of the images. As such, the system(s) 908 may detect that the event has occurred.

Additionally, or alternatively, and at 1306, the system(s) 908 may detect the event by detecting an interaction associated with the item. For instance, the system(s) 908 may receive data. In some examples, the data may include image data generated by one or more imaging devices that include a respective FOV of the item. In such examples, the system(s) 908 may analyze the image data in order to determine that the image data represents an associate and/or user interacting with the item. In some examples, the data may include sensor data generated by a user device of an associate of the facility. In such examples, the system(s) 908 may analyze the sensor data in order to determine that the sensor data represents the associate performing a task associated with the item, such as restocking the item. In either of the examples, the system(s) 908 may detect the event.

Additionally, or alternatively, and at 1308, the system(s) 908 may detect the event by detecting that the item is new to a facility and/or an inventory location. For instance, the system(s) 908 may receive data. In some examples, the data may include image data generated by one or more imaging devices that include a respective FOV of the item. In such examples, the system(s) 908 may analyze the image data in order to determine that the image data represents the item being new to the facility and/or to the inventory location. In some examples, the data may include identifier data associated with the item. The system(s) 908 may then compare the identifier data to identifier data associated with other items at the facility to determine that the item is new. In either of the examples, the system(s) 908 may detect the event.

Additionally, or alternative, and at 1310, the system(s) 908 may detect the event by detecting a state associated with a collection of images for the item. For instance, the system(s) 908 may analyze the collection of images in order to determine a number of images that are included in the collection of images. The system(s) 908 may then determine that the collection of images is in a first state when a number of images included in the collection of images is less than a first threshold. The system(s) 908 may also determine that the collection of images is in a second state when the number of images included in the collection of images is between the first threshold and a second threshold. As described herein, the first state may include a critical state indicating that more images should be added to the collection of images while the second state includes a non-critical state indicating that the collection of images includes an adequate number of images. In some examples, the system(s) 908 detect the event by detecting that the collection of images is in the first state.

At 1312, the process 1300 may include determining, based at least in part on the event, to retrieve image data representing the item and at 1314, the process 1300 may include determining a priority associated with retrieving the image data. For instance, the system(s) 908 may determine to retrieve the image data based on detecting the event. The system(s) 908 may then determine the priority associated with the item. In some examples, the system(s) 908 determine the priority using one or more factors. The one or more factors may include, but are not limited to, a type of event, a time period that the facility is open, a time period that the facility is closed, and/or any other factor. In some examples, the system(s) 908 may then generate data representing the priorities for the items.

At 1316, the process 1300 may include retrieving the image data based at least in part on the priority. For instance, the system(s) 908 may use the priority to retrieve the image data. For example, if the system(s) 908 determine that the priority for the item includes the highest priority, then the system(s) 908 may determine to initially retrieve the image data for the item. However, if the system(s) 908 determine that the priority for the item does not include highest priority, then the system(s) 908 may determine to retrieve image data for at least one higher priority item before retrieving the image data for the item. Additionally, in some examples, the system(s) 908 may use other factors, such as times that the facility is open, when retrieving the image data. For example, even if the system(s) 908 determine that the priority of the item includes the highest priority, the system(s) 908 may still wait to retrieve the image data until the facility is open.

In some examples, the system(s) 908 retrieve the image data by sending, to one or more imaging devices, data representing a request to generate and/or send the image data. In such examples, the system(s) 908 may use processes similar to those discussed above in order to identify the imaging devices. Additionally, or alternatively, in some examples, the system(s) 908 retrieve the image data by sending, to one or more other computing devices that store image data for imaging devices, data representing a request for the image data. In such examples, the request may include at least one identifier of at least one imaging device for retrieving the image data, one or more times for the image data, and/or any other information.

At 1318, the process 1300 may include storing the image data as part of the collection of images for the item. For instance, the system(s) 908 may store the image data as part of the collection of images. In some examples, such as when the number of images within the collection of images is greater than the second threshold, the system(s) 908 may initially remove one or more images from the collection of images, using one or more of the processes described herein. The system(s) 908 may then add the new image(s) to the collection of images. In some examples, such as when the number of images is less than the second threshold, the system(s) 908 may just add the new image(s) to the collection of images. Additionally, in some examples, the system(s) 908 may continue to repeat the process 1300 starting back at 1302.

Figure 14:
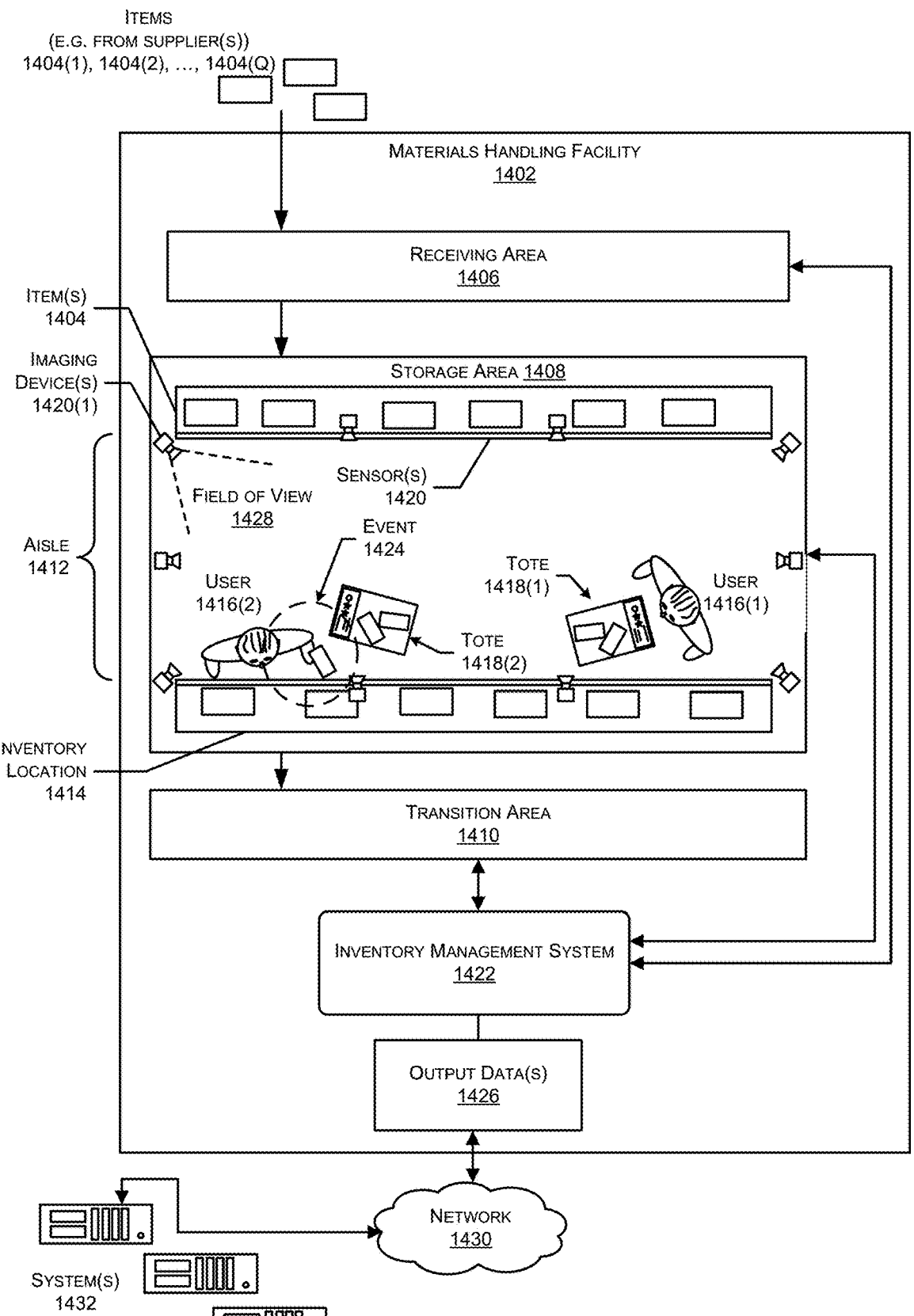
FIG. 14 is a block diagram of an example materials handling facility that includes sensors and an inventory management system configured to generate output regarding events occurring in the facility using the sensor data, in accordance with examples of the present examples.
Figure 15:
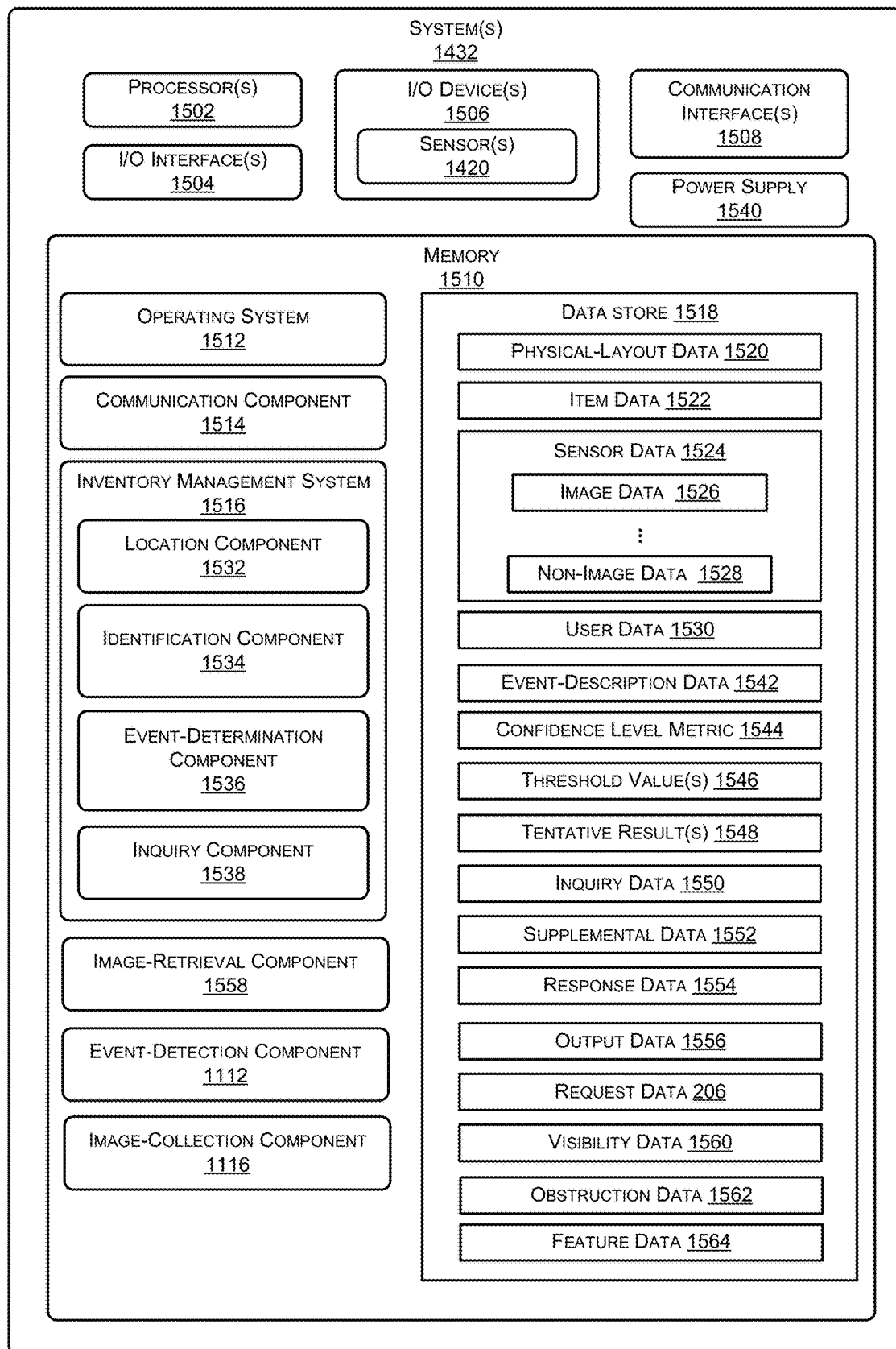
FIG. 15 illustrates a block diagram of one or more systems configured to support operations described herein, in accordance with examples of the present disclosure.

FIGS. 14 and 15 represent an illustrative materials handling environment in which the techniques described herein may be applied to imaging devices monitoring the environments as described below. However, the following description is merely one illustrative example of an industry and environment in which the techniques described herein may be utilized. The materials handling facility 1402 (or "facility") comprises one or more physical structures or areas within which one or more items 1404(1), 1404(2), . . . , 1404(Q) (generally denoted as 1404) may be held. As used in this disclosure, letters in parentheses such as "(Q)" indicate an integer result. The items 1404 comprise physical goods, such as books, pharmaceuticals, repair parts, electronic gear, groceries, and so forth.

The facility 1402 may include one or more areas designated for different functions with regard to inventory handling. In this illustration, the facility 1402 includes a receiving area 1406, a storage area 1408, and a transition area 1410. The receiving area 1406 may be configured to accept items 1404, such as from suppliers, for intake into the facility 1402. For example, the receiving area 1406 may include a loading dock at which trucks or other freight conveyances unload the items 1404.

The storage area 1408 is configured to store the items 1404. The storage area 1408 may be arranged in various physical configurations. In one implementation, the storage area 1408 may include one or more aisles 1412. The aisle 1412 may be configured with, or defined by, inventory locations 1414 on one or both sides of the aisle 1412. The inventory locations 1414 may include one or more of shelves, racks, cases, cabinets, bins, floor locations, or other suitable storage mechanisms for holding or storing the items 1404. The inventory locations 1414 may be affixed to the floor or another portion of the facility's structure, or may be movable such that the arrangements of aisles 1412 may be reconfigurable. In some implementations, the inventory locations 1414 may be configured to move independently of an outside operator. For example, the inventory locations 1414 may comprise a rack with a power source and a motor, operable by a computing device to allow the rack to move from one location within the facility 1402 to another.

One or more users 1416(1), 1416(2) (generally denoted as 1416), totes 1418(1), 1418(2) (generally denoted as 1418) or other material handling apparatus may move within the facility 1402. For example, the users 1416 may move about within the facility 1402 to pick or place the items 1404 in various inventory locations 1414, placing them on the totes 1418 for ease of transport. An individual tote 1418 is configured to carry or otherwise transport one or more items 1404. For example, a tote 1418 may include a basket, a cart, a bag, and so forth. In other implementations, other agencies such as robots, forklifts, cranes, aerial drones, and so forth, may move about the facility 1402 picking, placing, or otherwise moving the items 1404.

One or more sensors 1420 may be configured to acquire information in the facility 1402. The sensors 1420 in the facility 1402 may include sensors fixed in the environment (e.g., ceiling-mounted cameras) or otherwise, such as sensors in the possession of users (e.g., mobile phones, tablets, etc.). The sensors 1420 may include, but are not limited to, imaging devices 1420(1), weight sensors, radio frequency (RF) receivers, temperature sensors, humidity sensors, vibration sensors, and so forth. The sensors 1420 may be stationary or mobile, relative to the facility 1402. For example, the inventory locations 1414 may contain imaging devices 1420(1) configured to acquire images of pick or placement of items 1404 on shelves, of the users 1416(1) and 1416(2) in the facility 1402, and so forth. In another example, the floor of the facility 1402 may include weight sensors configured to determine a weight of the users 1416 or another object thereupon.

During operation of the facility 1402, the sensors 1420 may be configured to provide information suitable for tracking how objects move or other occurrences within the facility 1402. For example, a series of images acquired by a imaging devices 1420(1) may indicate removal of an item 1404 from a particular inventory location 1414 by one of the users 1416 and placement of the item 1404 on or at least partially within one of the totes 1418.

While the storage area 1408 is depicted as having one or more aisles 1412, inventory locations 1414 storing the items 1404, sensors 1420, and so forth, it is understood that the receiving area 1406, the transition area 1410, or other areas of the facility 1402 may be similarly equipped. Furthermore, the arrangement of the various areas within the facility 1402 is depicted functionally rather than schematically. For example, multiple different receiving areas 1406, storage areas 1408, and transition areas 1410 may be interspersed rather than segregated in the facility 1402.

The facility 1402 may include, or be coupled to, an inventory management system 1422, which may perform some or all of the techniques described above with reference to FIGS. 1-13. For example, the inventory management system 1422 may maintain a virtual cart of each user within the facility 1402. The inventory management system 1422 may also store a record associated with each user indicating the location of the user, and whether the user is eligible to exit the facility 1402 with one or more items without performing a manual checkout of the items. The inventory management system 1422 may also generate and output notification data to the users 1416, indicating whether or not they are so eligible.

As illustrated, the inventory management system 1422 may reside at the facility 1402 (e.g., as part of on-premises servers), over network(s) 1430 and on the servers 1432 that are remote from the facility 1402, a combination thereof. In each instance, the inventory management system 1422 is configured to identify interactions and events with and between users 1416, devices such as sensors 1420, robots, material handling equipment, computing devices, and so forth, in one or more of the receiving area 1406, the storage area 1408, or the transition area 1410. As described above, some interactions may further indicate the existence of one or more events 1424, or predefined activities of interest. For example, events 1424 may include the entry of the user 1416 to the facility 1402, stocking of items 1404 at an inventory location 1414, picking of an item 1404 from an inventory location 1414, returning of an item 1404 to an inventory location 1414, placement of an item 1404 within a tote 1418, movement of users 1416 relative to one another, gestures by the users 1416, and so forth. Other events 1424 involving users 1416 may include the user 1416 providing authentication information in the facility 1402, using a computing device at the facility 1402 to authenticate the user to the inventory management system 1422, and so forth. Some events 1424 may involve one or more other objects within the facility 1402. For example, the event 1424 may comprise movement within the facility 1402 of an inventory location 1414, such as a counter mounted on wheels. Events 1424 may involve one or more of the sensors 1420. For example, a change in operation of a sensor 1420, such as a sensor failure, change in alignment, and so forth, may be designated as an event 1424. Continuing the example, movement of an imaging device 1420(1) resulting in a change in the orientation of the field of view 1428 (such as resulting from someone or something bumping the imaging device 1420(1)) may be designated as an event 1424.

By determining the occurrence of one or more of the events 1424, the inventory management system 1422 may generate output data 1426. The output data 1426 comprises information about the event 1424. For example, where the event 1424 comprises an item 1404 being removed from an inventory location 1414, the output data 1426 may comprise an item identifier indicative of the particular item 1404 that was removed from the inventory location 1414 and a user identifier of a user that removed the item.

The inventory management system 1422 may use one or more automated systems to generate the output data 1426. For example, an artificial neural network, one or more classifiers, or other automated machine learning techniques may be used to process the sensor data from the one or more sensors 1420 to generate output data 1426. For example, the inventory management system 1422 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 1426 or the tentative results. The automated systems may generate confidence level data that provides information indicative of the accuracy or confidence that the output data 1426 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 98%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1404, user 1416, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1416 may pick an item 1404(1) such as a perfume bottle that is generally cubical in shape from the inventory location 1414. Other items 1404 at nearby inventory locations 1414 may be predominantly spherical. Based on the difference in shape (cube vs. sphere) from the adjacent items, and the correspondence in shape with the previously stored image of the perfume bottle item 1404(1) (cubical and cubical), the confidence level that the user has picked up the perfume bottle item 1404(1) is high.

In some situations, the automated techniques may be unable to generate output data 1426 with a confidence level above a threshold result. For example, the automated techniques may be unable to distinguish which user 1416 in a crowd of users 1416 has picked up the item 1404 from the inventory location 1414. In other situations, it may be desirable to provide human confirmation of the event 1424 or of the accuracy of the output data 1426. For example, some items 1404 may be deemed age restricted such that they are to be handled only by users 1416 above a minimum age threshold.

In instances where human confirmation is desired, sensor data associated with an event 1424 may be processed to generate inquiry data. The inquiry data may include a subset of the sensor data associated with the event 1424. The inquiry data may also include one or more of one or more tentative results as determined by the automated techniques, or supplemental data. The subset of the sensor data may be determined using information about the one or more sensors 1420. For example, camera data such as the location of the imaging device 1420(1) within the facility 1402, the orientation of the imaging device 1420(1), and a field of view 1428 of the imaging device 1420(1) may be used to determine if a particular location within the facility 1402 is within the field of view 1428. The subset of the sensor data may include images that may show the inventory location 1414 or that the item 1404 was stowed. The subset of the sensor data may also omit images from other imaging devices 1420(1) that did not have that inventory location 1414 in the field of view 1428. The field of view 1428 may comprise a portion of the scene in the facility 1402 that the sensor 1420 is able to generate sensor data about.

Continuing the example, the subset of the sensor data may comprise a video clip acquired by one or more imaging devices 1420(1) having a field of view 1428 that includes the item 1404. The tentative results may comprise the "best guess" as to which items 1404 may have been involved in the event 1424. For example, the tentative results may comprise results determined by the automated system that have a confidence level above a minimum threshold.

The facility 1402 may be configured to receive different kinds of items 1404 from various suppliers and to store them until a customer orders or retrieves one or more of the items 1404. A general flow of items 1404 through the facility 1402 is indicated by the arrows of FIG. 14. Specifically, as illustrated in this example, items 1404 may be received from one or more suppliers, such as manufacturers, distributors, wholesalers, and so forth, at the receiving area 1406. In various implementations, the items 1404 may include merchandise, commodities, perishables, or any suitable type of item 1404, depending on the nature of the enterprise that operates the facility 1402. The receiving of the items 1404 may comprise one or more events 1424 for which the inventory management system 1422 may generate output data 1426.

Upon being received from a supplier at receiving area 1406, the items 1404 may be prepared for storage. For example, items 1404 may be unpacked or otherwise rearranged. The inventory management system 1422 may include one or more software applications executing on a computer system to provide inventory management functions based on the events 1424 associated with the unpacking or rearrangement. These inventory management functions may include maintaining information indicative of the type, quantity, condition, cost, location, weight, or any other suitable parameters with respect to the items 1404. The items 1404 may be stocked, managed, or dispensed in terms of countable, individual units or multiples, such as packages, cartons, crates, pallets, or other suitable aggregations. Alternatively, some items 1404, such as bulk products, commodities, and so forth, may be stored in continuous or arbitrarily divisible amounts that may not be inherently organized into countable units. Such items 1404 may be managed in terms of measurable quantity such as units of length, area, volume, weight, time, duration, or other dimensional properties characterized by units of measurement. Generally speaking, a quantity of an item 1404 may refer to either a countable number of individual or aggregate units of an item 1404 or a measurable amount of an item 1404, as appropriate.

After arriving through the receiving area 1406, items 1404 may be stored within the storage area 1408. In some implementations, like items 1404 may be stored or displayed together in the inventory locations 1414 such as in bins, on shelves, hanging from pegboards, and so forth. In this implementation, all items 1404 of a given kind are stored in one inventory location 1414. In other implementations, like items 1404 may be stored in different inventory locations 1414. For example, to optimize retrieval of certain items 1404 having frequent turnover within a large physical facility 1402, those items 1404 may be stored in several different inventory locations 1414 to reduce congestion that might occur at a single inventory location 1414. Storage of the items 1404 and their respective inventory locations 1414 may comprise one or more events 1424.

When a customer order specifying one or more items 1404 is received, or as a user 1416 progresses through the facility 1402, the corresponding items 1404 may be selected or "picked" from the inventory locations 1414 containing those items 1404. In various implementations, item picking may range from manual to completely automated picking. For example, in one implementation, a user 1416 may have a list of items 1404 they desire and may progress through the facility 1402 picking items 1404 from inventory locations 1414 within the storage area 1408, and placing those items 1404 into a tote 1418. In other implementations, employees of the facility 1402 may pick items 1404 using written or electronic pick lists derived from customer orders. These picked items 1404 may be placed into the tote 1418 as the employee progresses through the facility 1402. Picking may comprise one or more events 1424, such as the user 1416 in moving to the inventory location 1414, retrieval of the item 1404 from the inventory location 1414, and so forth.

After items 1404 have been picked, they may be processed at a transition area 1410. The transition area 1410 may be any designated area within the facility 1402 where items 1404 are transitioned from one location to another or from one entity to another. For example, the transition area 1410 may be a packing station within the facility 1402. When the item 1404 arrives at the transition area 1410, the items 1404 may be transitioned from the storage area 1408 to the packing station. The transitioning may comprise one or more events 1424. Information about the transition may be maintained by the inventory management system 1422 using the output data 1426 associated with those events 1424.

In another example, if the items 1404 are departing the facility 1402 a list of the items 1404 may be obtained and used by the inventory management system 1422 to transition responsibility for, or custody of, the items 1404 from the facility 1402 to another entity. For example, a carrier may accept the items 1404 for transport with that carrier accepting responsibility for the items 1404 indicated in the list. In another example, a customer may purchase or rent the items 1404 and remove the items 1404 from the facility 1402. The purchase or rental may comprise one or more events 1424.

The inventory management system 1422 may access or generate sensor data about the facility 1402 and the contents therein including the items 1404, the users 1416, the totes 1418, and so forth. The sensor data may be acquired by one or more of the sensors 1420, data provided by other systems, and so forth. For example, the sensors 1420 may include imaging devices 1420(1) configured to acquire image data of scenes in the facility 1402. The image data may comprise still images, video, or a combination thereof. The image data may be processed by the inventory management system 1422 to determine a location of the user 1416, the tote 1418, the identifier of the user 1416, and so forth. As used herein, the identity of the user may represent a unique identifier of the user (e.g., name, number associated with user, username, etc.), an identifier that distinguishes the user amongst other users being located within the environment, or the like.

The inventory management system 1422, or systems coupled thereto, may be configured to associate an account with the user 1416, as well as to determine other candidate users. An account of the user 1416 may be determined before, during, or after entry to the facility 1402.

In some instances, the inventory management system 1422 groups users within the facility into respective sessions. That is, the inventory management system 1422 may utilize the sensor data to determine groups of users that are effectively "together" (e.g., shopping together). In some instances, a particular session may include multiple users that entered the facility 1402 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 1418. Noting the child and the mother as belonging to the same session may increase the chances of successfully adding the box of cereal to the virtual shopping cart of the mother.

By determining the occurrence of one or more events 1424 and the output data 1426 associated therewith, the inventory management system 1422 is able to provide one or more services to the users 1416 of the facility 1402. By utilizing one or more facility associates to process inquiry data and generate response data that may then be used to produce output data 1426, overall accuracy of the system may be enhanced. The enhanced accuracy may improve the user experience of the one or more users 1416 of the facility 1402. In some examples, the output data 1426 may be transmitted over network(s) 1430 to one or more servers 1432 (e.g., remote system(s)).

FIG. 15 illustrates a block diagram of the system(s) 1432. The system(s) 1432 may be physically present at the facility 1402, may be accessible by the network(s) 1430, or a combination of both. The system(s) 1432 do not require end-user knowledge of the physical location and configuration of the system that delivers the services. Common expressions associated with the system(s) 1432 may include "on-demand computing," "software as a service (SaaS)," "cloud services," "data centers," "remote system(s)", and so forth. Services provided by the system(s) 1432 may be distributed across one or more physical or virtual devices.

The system(s) 1432 may include one or more hardware processors 1502 (processors) configured to execute one or more stored instructions. The processor(s) 1502 may comprise one or more cores. The system(s) 1432 may include one or more input/output (I/O) interfaces 1504 to allow the processor 1502 or other portions of the system(s) 1432 to communicate with other devices. The I/O interface(s) 1504 may comprise Inter-Integrated Circuit (I2C), Serial Peripheral Interface bus (SPI), Universal Serial Bus (USB) as promulgated by the USB Implementers Forum, and so forth.

The system(s) 1432 may also include one or more communication interfaces 1508. The communication interface(s) 1508 are configured to provide communications between the system(s) 1432 and other devices, such as the sensors 1420, the interface devices, routers, and so forth. The communication interface(s) 1508 may include devices configured to couple to personal area networks (PANs), wired and wireless local area networks (LANs), wired and wireless wide area networks (WANs), and so forth. For example, the communication interface(s) 1508 may include devices compatible with Ethernet, Wi-Fi™, and so forth. The system(s) 1432 may also include one or more busses or other internal communications hardware or software that allow for the transfer of data between the various modules and components of the servers 1432.

The system(s) 1432 may also include a power supply 1540. The power supply 1540 is configured to provide electrical power suitable for operating the components in the system(s) 1432.

The system(s) 1432 may further include one or more memories 1510. The memory 1510 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1510 provides storage of computer-readable instructions, data structures, program modules, and other data for the operation of the servers 1432. A few example functional modules are shown stored in the memory 1510, although the same functionality may alternatively be implemented in hardware, firmware, or as a system on a chip (SOC).

The memory 1510 may include at least one operating system (OS) component 1512. The OS component 1512 is configured to manage hardware resource devices such as the I/O interface(s) 1504, the communication interface(s) 1508, and provide various services to applications or components executing on the processor(s) 1502. The OS component 1512 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1510. These components may be executed as foreground applications, background tasks, daemons, and so forth. Communication component(s) 1514 may be configured to establish communications with one or more of the sensors 1420, one or more of the devices used by associates, other system(s) 1432, or other devices. The communications may be authenticated, encrypted, and so forth.

The memory 1510 may store an inventory management system 1516. The inventory management system 1516 is configured to provide the inventory functions as described herein with regard to the inventory management system 1422. For example, the inventory management system 1516 may track movement of items 1404 in the facility 1402, generate user interface data, and so forth.

The inventory management system 1516 may access information stored in one or more data stores 1518 in the memory 1510. The data store(s) 1518 may use a flat file, data stores, linked list, tree, executable code, script, or other data structure to store the information. In some implementations, the data store(s) 1518 or a portion of the data store(s) 1518 may be distributed across one or more other devices including other servers 1432, network attached storage devices, and so forth.

The data store(s) 1518 may include physical layout data 1520. The physical layout data 1520 provides a mapping of physical locations within the physical layout of devices and objects such as the sensors 820, inventory locations 814, and so forth. The physical layout data 1520 may indicate the coordinates within the facility 1402 of an inventory location 814, sensors 820 within view of that inventory location 814, and so forth. For example, the physical layout data 1520 may include camera data comprising one or more of a location within the facility 1402 of an imaging device 820(1), orientation of the imaging device 820(1), the operational status, and so forth. Continuing example, the physical layout data 1520 may indicate the coordinates of the imaging device 820(1), pan and tilt information indicative of a direction that the field of view 1428 is oriented along, whether the imaging device 1420(1) is operating or malfunctioning, and so forth.

In some implementations, the inventory management system 1516 may access the physical layout data 1520 to determine if a location associated with the event 1424 is within the field of view 1428 of one or more sensors 1420. Continuing the example above, given the location within the facility 1402 of the event 1424 and the camera data, the inventory management system 1516 may determine the imaging devices 1420(1) that may have generated images of the event 1424.

The item data 1522 comprises information associated with the items 1404. The information may include information indicative of one or more inventory locations 1414 at which one or more of the items 1404 are stored. The item data 1522 may also include order data, SKU or other product identifier, price, quantity on hand, weight, expiration date, images of the item 1404, detail description information, ratings, ranking, and so forth. The inventory management system 1516 may store information associated with inventory management functions in the item data 1522.

The data store(s) 1518 may also include sensor data 1524. The sensor data 1524 comprises information acquired from, or based on, the one or more sensors 1420. For example, the sensor data 1524 may comprise 3D information about an object in the facility 1402. As described above, the sensors 1420 may include an imaging device 1420(1), which is configured to acquire one or more images. These images may be stored as the image data 1526. The image data 1526 may comprise information descriptive of a plurality of picture elements or pixels. Non-image data 1528 may comprise information from other sensors 1420, such as input from microphones, weight sensors, and so forth.

User data 1530 may also be stored in the data store(s) 1518. The user data 1530 may include identity data, information indicative of a profile, purchase history, location data, and so forth. Individual users 1416 or groups of users 1416 may selectively provide user data 1530 for use by the inventory management system 1516. The individual users 1416 or groups of users 1416 may also authorize collection of the user data 1530 during use of the facility 1402 or access to user data 1530 obtained from other systems. For example, the user 1416 may opt-in to collection of the user data 1530 to receive enhanced services while using the facility 1402.

In some implementations, the user data 1530 may include information designating a user 1416 for special handling. For example, the user data 1530 may indicate that a particular user 1416 has been associated with an increased number of errors with respect to output data 1426. The inventory management system 1516 may be configured to use this information to apply additional scrutiny to the events 1424 associated with this user 1416. For example, events 1424 that include an item 1404 having a cost or result above the threshold amount may be provided to a facility associate for processing regardless of the determined level of confidence in the output data 1426 as generated by the automated system.

The inventory management system 1516 may include one or more of a location component 1532, identification component 1534, event-determination component 1536, and an inquiry component 1538.

The location component 1532 functions to locate items 1404 or users 1416 within the environment of the facility 1402 to allow the inventory management system 1516 to assign certain events to the correct users 1416. That is, the location component 1532 may assign unique identifiers to users 1416 as they enter the facility and, with the users' consent, may locate the users 1416 throughout the facility 1402 over the time they remain in the facility 1402. The location component 1532 may perform this locating using sensor data 1524, such as the image data 1526. For example, the location component 1532 may receive the image data 1526 and may use techniques to identify users 1416 from the images. After identifying a particular user 1416 within the facility 1402, the location component 1532 may then locate the user 1416 within the images as the user 1416 moves throughout the facility 1402. Further, should the location component 1532 temporarily "lose" a particular user 1416, the location component 1532 may again attempt to identify the users 1416 within the facility 1402 based on techniques.

Therefore, upon receiving the indication of the time and location of the event in question, the location component 1532 may query the data store 1518 to determine which one or more users 1416 were at or within a threshold distance of the location of the event at the particular time of the event. Further, the location component 1532 may assign different confidence levels to different users 1416, with the confidence levels indicating how likely it is that each corresponding user 1416 is the user 1416 that is in fact associated with the event of interest.

The location component 1532 may access the sensor data 1524 in order to determine this location data of the user 1416 and/or items 1404. The location data provides information indicative of a location of an object, such as the item 1404, the user 1416, the tote 1418, and so forth. The location may be absolute with respect to the facility 1402 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1402, 5.2 m from an inventory location 1414 along a heading of 1615°, and so forth. For example, the location data may indicate that the user 1416(1) is 25.2 m along the aisle 1412(1) and standing in front of the inventory location 814. In comparison, a relative location may indicate that the user 1416(1) is 32 cm from the tote 818 at a heading of 73° with respect to the tote 1418. The location data may include orientation information, such as which direction the user 1416 is facing. The orientation may be determined by the relative direction the user's 1416 body is facing. In some implementations, the orientation may be relative to the interface device. Continuing the example, the location data may indicate that the user 1416(1) is oriented with a heading of 0°, or looking north. In another example, the location data may indicate that the user 1416 is facing towards the interface device.

The identification component 1534 is configured to identify an object. In one implementation, the identification component 1534 may be configured to identify an item 1404. In another implementation, the identification component 1534 may be configured to identify the user 1416. For example, the identification component 1534 may use various techniques to process the image data 1526 and determine the user 1416 depicted in the images by comparing the characteristics in the image data 1526 with previously stored results. The identification component 1534 may also access data from other sensors 1420, such as from an RFID reader, an RF receiver, and so forth.

The event-determination component 1536 is configured to process the sensor data 1524 and generate output data 1426, and may include components described above. The event-determination component 1536 may access information stored in the data store(s) 1518 including, but not limited to, event-description data 1542, confidence levels 1544, or threshold values 1546. In some instances, the event-determination component 1536 may be configured to perform some or all of the techniques described above with regards to the event-determination component 1536. For instance, the event-determination component 1536 may be configured to create and utilize event classifiers for identifying events (e.g., predefined activity) within image data, potentially without use of other sensor data acquired by other sensors in the environment.

The event-description data 1542 comprises information indicative of one or more events 824. For example, the event-description data 1542 may comprise predefined profiles that designate movement of an item 1404 from an inventory location 1414 with the event 1424 of "pick". The event-description data 1542 may be manually generated or automatically generated. The event-description data 1542 may include data indicative of triggers associated with events occurring in the facility 1402. An event may be determined as occurring upon detection of the trigger. For example, sensor data 1524 such as a change in weight from a weight sensor 1420 at an inventory location 1414 may trigger detection of an event of an item 1404 being added or removed from the inventory location 1414. In another example, the trigger may comprise an image of the user 1416 reaching a hand toward the inventory location 1414. In yet another example, the trigger may comprise two or more users 1416 approaching to within a threshold distance of one another.

The event-determination component 1536 may process the sensor data 1524 using one or more techniques including, but not limited to, artificial neural networks, classifiers, decision trees, support vector machines, Bayesian networks, and so forth. For example, the event-determination component 1536 may use a decision tree to determine occurrence of the "pick" event 1424 based on sensor data 1524. The event-determination component 1536 may further use the sensor data 1524 to determine one or more tentative results 1548. The one or more tentative results 1548 comprise data associated with the event 1424. For example, where the event 1424 comprises a disambiguation of users 1416, the tentative results 1548 may comprise a list of possible user 1416 identities. In another example, where the event 1424 comprises a disambiguation between items, the tentative results 1548 may comprise a list of possible item identifiers. In some implementations, the tentative result 1548 may indicate the possible action. For example, the action may comprise the user 1416 picking, placing, moving an item 804, damaging an item 804, providing gestural input, and so forth.

In some implementations, the tentative results 1548 may be generated by other components. For example, the tentative results 1548 such as one or more possible identities or locations of the user 1416 involved in the event 1424 may be generated by the location component 1532. In another example, the tentative results 1548 such as possible items 1404 that may have been involved in the event 1424 may be generated by the identification component 1534.

The event-determination component 1536 may be configured to provide a confidence level 1544 associated with the determination of the tentative results 1548. The confidence level 1544 provides indicia as to the expected level of accuracy of the tentative result 1548. For example, a low confidence level 1544 may indicate that the tentative result 1548 has a low probability of corresponding to the actual circumstances of the event 1424. In comparison, a high confidence level 1544 may indicate that the tentative result 1548 has a high probability of corresponding to the actual circumstances of the event 1424.

In some implementations, the tentative results 1548 having confidence levels 1544 that exceed the threshold may be deemed to be sufficiently accurate and thus may be used as the output data 1556. For example, the event-determination component 1536 may provide tentative results 1548 indicative of the three possible items 1404(1), 1404(2), and 1404(3) corresponding to the "pick" event 1424. The confidence levels 1544 associated with the possible items 1404 (1), 1404(2), and 1404(3) may be 25%, 70%, 92%, respectively. Continuing the example, the threshold value 1546 may be set such that confidence level 1544 of 95% are deemed to be sufficiently accurate. As a result, the event-determination component 1536 may designate the "pick" event 1424 as involving item 1404(3).

The inquiry component 1538 may be configured to use at least a portion of the sensor data 1524 associated with the event 1424 to generate inquiry data 1550. In some implementations, the inquiry data 1550 may include one or more of the tentative results 1548 or supplemental data 1552. The inquiry component 1538 may be configured to provide inquiry data 1550 to one or more devices associated with one or more human associates.

An associate user interface is presented on the respective devices of associates. The associate may generate response data 1554 by selecting a particular tentative result 1548, entering new information, indicating that they are unable to answer the inquiry, and so forth.

The supplemental data 1552 comprises information associated with the event 1424 or that may be useful in interpreting the sensor data 1524. For example, the supplemental data 1552 may comprise previously stored images of the items 1404. In another example, the supplemental data 1552 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1526 during presentation to an associate.

The inquiry component 1538 processes the response data 1554 provided by the one or more associates. The processing may include calculating one or more statistical results associated with the response data 1554. For example, statistical results may include a count of the number of times associates selected a particular tentative result 1548, determination of a percentage of the associates that selected a particular tentative result 1548, and so forth.

The inquiry component 1538 is configured to generate the output data 1556 based at least in part on the response data 1554. For example, given that a majority of the associates returned response data 1554 indicating that the item 1404 associated with the "pick" event 1424 is item 1404(1), the output data 1426 may indicate that the item 1404(1) was picked.

The inquiry component 1538 may be configured to selectively distribute inquiries to particular associates. For example, some associates may be better suited to answering particular types of inquiries. Performance data, such as statistical data about the performance of the associates, may be determined by the inquiry component 1538 from the response data 1554 provided by the associates. For example, information indicative of a percentage of different inquiries in which the particular associate selected response data 1554 that disagreed with the majority of associates may be maintained. In some implementations, test or practice inquiry data 1550 having a previously known correct answer may be provided to the associate for training or quality assurance purposes. The determination of the set of associates to use may be based at least in part on the performance data.

By using the inquiry component 1538, the event-determination component 1536 may be able to provide high reliability output data 1556 that accurately represents the event 1424. The output data 1556 generated by the inquiry component 1538 from the response data 1554 may also be used to further train the automated systems used by the inventory management system 1516. For example, the sensor data 1524 and the output data 1556, based on response data 1554, may be provided to one or more of the components of the inventory management system 1516 for training in process improvement. Continuing the example, this information may be provided to an artificial neural network, Bayesian network, and so forth, to further train these systems such that the confidence level 1544 and the tentative results 1548 produced in the future for the same or similar input is improved.

As further illustrated in the example of FIG. 15, the system(s) 1432 may include the event-detection component 1112, the collection component 1116, and an image-retrieval component 1558. The image-retrieval component 1558 may be configured to perform one or more of the processes described herein with respect to the retrieving image data representing images. For example, the image-retrieval component 1558 may include one or more of the validation component 204, the parsing component 210, the visibility component 214, the STS component 218, the occlusion-detection component 222, the filtering component 226, the video-retrieval component 230, the cropping component 234, the image-uploading component 238, and the output component 242. FIG. 15 further illustrates that the system(s) 1432 may include the request data 206, visibility data 1560, obstruction data 1562, and feature data 1564, which are described in more detail above.

Figure 16:
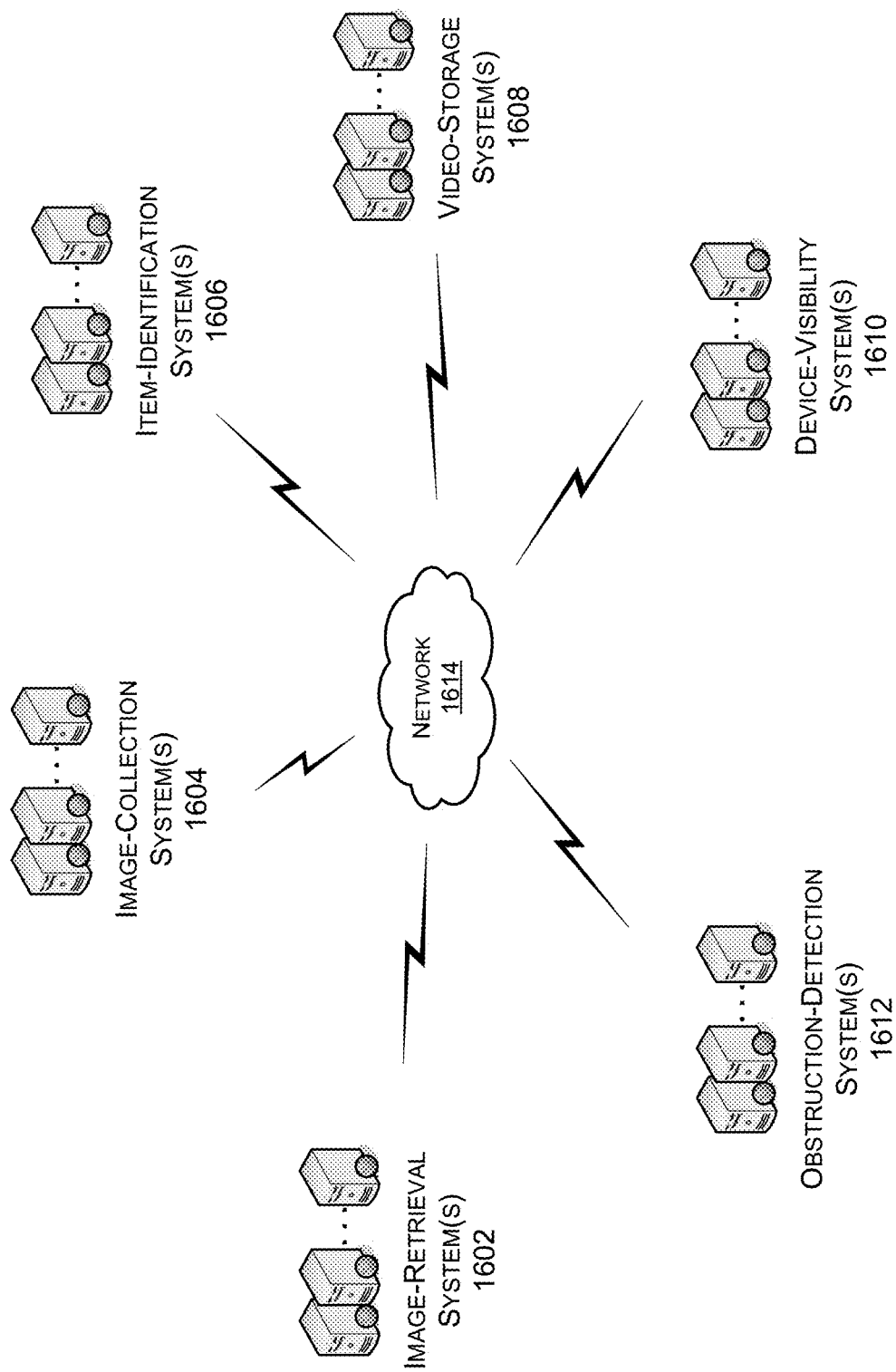
FIG. 16 illustrates an example of an environment that includes distributed systems that communicate to perform one or more processes described herein, in accordance with examples of the present disclosure.

FIG. 16 illustrates an example of an environment 1600 that includes distributed systems that communicate to perform one or more processes described herein, in accordance with examples of the present disclosure. As shown, the environment 1600 may include at least image-retrieval system(s) 1602, image-collection system(s) 1604, item-identification system(s) 1606, video-storage system(s) 1608, device-visibility system(s) 1610, and obstruction-detection system(s) 1612. Each of the systems 1602-1612 may communicate with one another using network(s) 1614. While the example of FIG. 16 illustrates each of the system 1602-1612 as being separate from one another, in other examples, one or more of the systems 1602-1612 may be combined into a single system.

The image-retrieval system(s) 1602 may be configured to perform one or more of the processes described herein with respect to retrieving image data representing images. For example, the image-retrieval system(s) 1602 may include the image-collection component 1558 for retrieving image data. The image-collection system(s) 1604 may be configured to perform one or more of the processes described herein with respect to detecting events and then generating and/or updating collections of images for items. For example, the image-collection system(s) 1604 may include the event-detection component 1112 and/or the collection component 1116. The item-identification system(s) 1606 may be configured to perform one or more of the processes described herein with respect to identifying events within a facility. For example, the item-identification system(s) 1606 may include at least the inventory management system 1516.

The video-storage system(s) 1608 may be configured to store image data representing videos, send data representing information about the videos (e.g., the resolutions, the identifiers of the imaging devices, etc.), receive data representing requests for the image data, and then send the image data based on the requests. For example, after the image-retrieval system(s) 1602 select image data for retrieval, the video-storage system(s) 1608 may receive data representing a request for the image data, where the request includes at least an identifier of an imaging device and a time associated with the image data. The video-storage system(s) 1608 may then identify the image data using the request. For example, the video-storage system(s) 1608 may use the identifier to identify the imaging device and then use the time to identify the image data, for the imaging device, that corresponds to the time (e.g., that was generated during the time). The video-storage system(s) 1608 may then send the image data to the image-retrieval system(s) 1602.

The device-visibility system(s) 1610 may be configured to generate and/or store the feature data 1564 and/or the visibility data 1560 described herein. Additionally, the device-visibility system(s) 1610 may be configured to provide the feature data 1564 and/or the visibility data 1560 to one or more of the other systems. For example, the device-visibility system(s) 1610 may receive, from the image-retrieval system(s) 1602, data (e.g., request data 206) representing a request for visibility information associated with imaging device(s). For example, the request may include an identifier of a facility, an identifier of an inventory location within the facility, an identifier of an item, a location (e.g., coordinates) within the facility, and/or any other information for identifying imaging device(s). The device-visibility system(s) 1610 may then use the request to identify imaging device(s) that includes FOV(s) relevant to the request. Additionally, the device-visibility system(s) 1610 may send, to the image-retrieval system(s) 1602, the visibility data 1560 associated with the identified imaging device(s).

The obstruction-detection system(s) 1612 may be configured to generate and/or store the obstruction data 1562 described herein. Additionally, the obstruction-detection system(s) 1612 may be configured to provide the obstruction data 1562 to one or more of the other systems. For example, the obstruction-detection system(s) 1612 may receive, from the image-retrieval system(s) 1602, data (e.g., request data 106) representing a request for obstruction information associated with imaging device(s). For example, the request may include identifier(s) of the imaging device(s), time period(s) associated with requested video(s), and/or any other information. The obstruction-detection system(s) 1612 may then use the request to identify image data for the imaging device(s) as well as the obstruction data 1562 associated with the image data. Additionally, the obstruction-detection system(s) 1612 may send, to the image-retrieval system(s) 1602, the obstruction data 1562.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method comprising:
receiving, from one or more computing devices, a request for image data representing an inventory location at a facility;
determining a type of the inventory location based at least in part on the request;
determining a region of the inventory location that is accessible to one or more users based at least in part on the type of the inventory location;
determining that a first imaging device has a first field-of-view (FOV) that includes the region;
determining that a second imaging device has a second FOV that includes the region;
determining first visibility data associated with the first imaging device, the first visibility data representing at least:
 a first visibility of the region using the first imaging device,
 a first number of pixels associated with the region, and
 a first angle of the first imaging device with respect to the inventory location;
determining, based at least in part on the first visibility data, a first visibility score of the first imaging device;
determining second visibility data associated with the second imaging device, the second visibility data representing at least:
 a second visibility of the region using the second imaging device,
 a second number of pixels associated with the region, and
 a second angle of the second imaging device with respect to the inventory location;
determining, based at least in part on the second visibility data, a second visibility score of the second imaging device;
determining that the first visibility score is greater than the second visibility score;
determining occlusion data associated with image data generated by the first imaging device, the occlusion data indicating a percentage of the region, represented by the image data, that is occluded by the one or more users;
determining that the percentage is less than a threshold percentage;
selecting the image data based at least in part on the first visibility score being greater than the second visibility score and the percentage being less than the threshold percentage; and
causing the selected image data to be stored.

2. The method as recited in claim 1, wherein the first visibility data further represents at least a percentage of pixels that are associated with the region.

3. The method as recited in claim 1, further comprising:
determining accessibility data associated with the region;
determining, based at least in part on the accessibility data, that the region is a first region associated with the inventory location that is accessible to the one or more users, the first region being associated with a top of the inventory location; and
determining an area of a second region associated with the inventory location, the second region being associated with a side of the inventory location,
and wherein determining that the first imaging device has the first FOV that includes the region comprises determining that the first imaging device has a FOV that includes at least one of the first region and the second region.

4. The method as recited in claim 1, further comprising:
determining accessibility data associated with the region; and
determining, based at least in part on the accessibility data, that the region is associated with a side of the inventory location,
and wherein determining that the first imaging device has the first FOV that includes the region comprises determining, based at least in part on the region being associated with the side of the inventory location, that the first imaging device has the first FOV that includes the region.

5. The method as recited in claim 1, further comprising:
determining accessibility data associated with the region;
determining, based at least in part on the accessibility data, that the region is a first region associated with the inventory location that is accessible to the one or more users;
determining, based at least in part on the accessibility data, that a second region associated with the inventory location is accessible to the one or more users;
determining a first area associated with the first region;
determining a second area associated with the second region; and
determining that the first area is greater than the second area,
and wherein determining the first imaging device has the first FOV that includes the region comprises determining, based at least in part on the first area being greater than the second area, that the first imaging device has the first FOV that includes the first region.

6. The method as recited in claim 1, further comprising:
determining second occlusion data associated with second image data generated by the first imaging device, the second occlusion data indicating a second percentage of the region, represented by the second image data, that is occluded by the one or more users;
determining that the second percentage is equal to or greater than the threshold percentage; and
discarding the second image data based at least in part on the second percentage being equal to or greater than the threshold percentage.

7. The method as recited in claim 1, further comprising:
determining second occlusion data associated with second image data generated by the second imaging device, the second occlusion data indicating a second percentage of the region, represented by the second image data, that is occluded by the one or more users;
determining that the second percentage is equal to or greater than the threshold percentage; and
refraining from selecting the second imaging device based at least in part on the second percentage being equal to or greater than the threshold percentage.

8. The method as recited in claim 1, further comprising:
refraining from selecting the second imaging device based at least in part on the first score being greater than the second score.

9. The method as recited in claim 1, further comprising:
determining that a portion of the image data represents at least one user of the one or more users; and
processing the image data by at least one of removing pixels represented by the portion of the image data or obfuscating the pixels represented by the portion of the image data.

10. The method as recited in claim 1, further comprising:
receiving video data generated by the first imaging device, the video data including at least the image data representing a first image and second image data representing a second image;
determining a time associated with the image data; and
retrieving the image data from the video data.

11. The method as recited in claim 1, further comprising:
sending, to one or more computing devices, a request for the image data, the request including at least:
an identifier associated with the first imaging device; and
a timestamp associated with the image data; and
based at least in part on sending the request, receiving the image data from the one or more computing devices.

12. The method as recited in claim 1, wherein the request includes at least one of:
an identifier associated with the inventory location;
an identifier associated with an item; or
a time period; and
further comprising sending, to the one or more computing devices, a notification associated with the image data, the notification including at least an address for retrieving the image data.

13. The method as recited in claim 1, further comprising:
outputting data representing a list of at least the first imaging device and the second imaging device, wherein the list is ordered based on the first visibility score of the first imaging device and the second visibility score of the second imaging device.

14. A system comprising:
one or more processors; and
one or more computer-readable media storing instructions that, when executed by the one or more processors, cause the one or more processors to perform operations comprising:
receiving, from one or more computing devices, a request for image data representing an inventory location at a facility;
determining a type of the inventory location based at least in part on the request;
determining a first region of the inventory location that is accessible by one or more users based at least in part on the type of the inventory location;
determining, based at least in part on the first region, a second region associated with the inventory location for retrieving image data;
identifying a first imaging device, located within the facility, that has a first field-of-view (FOV) that includes at least the second region associated with the inventory location;
identifying a second imaging device, located within the facility, that has a second FOV that includes at least the second region;
determining first visibility data associated with the first imaging device, the first visibility data representing at least:
a first visibility of the second region using the first imaging device,
a first number of pixels associated with the second region, and
a first angle of the first imaging device with respect to the inventory location;
determining, based at least in part on the first visibility data, a first visibility score of the first imaging device;
determining second visibility data associated with the second imaging device, the second visibility data representing at least:
a second visibility of the second region using the second imaging device,
a second number of pixels associated with the second region, and
a second angle of the second imaging device with respect to the inventory location;
determining, based at least in part on the second visibility data, a second visibility score of the second imaging device;
determining that the first visibility score is greater than the second visibility score;
determining occlusion data associated with the image data generated by the first imaging device, the occlusion data indicating a percentage of the second region, represented by the image data, that is occluded by one or more objects;
determining that the percentage is less than a threshold percentage;
selecting the image data based at least in part on the first visibility score being greater than the second visibility score and the percentage being less than the threshold percentage; and
storing the selected image data.

15. The system as recited in claim 14, the operations further comprising:
determining that a third region associated with the inventory location is accessible by the one or more users,
and wherein determining the second region is further based at least in part on the third region.

16. The system as recited in claim 14, wherein:
the first region includes a same region as the second region; or
the first region includes a different region than the second region.

17. The system as recited in claim 13, the operations further comprising:
outputting data representing a list of at least the first imaging device and the second imaging device, wherein the list is ordered based on the first visibility score of the first imaging device and the second visibility score of the second imaging device.

18. A system comprising:
one or more processors; and
one or more computer-readable media storing instructions that, when executed by the one or more processors, cause the one or more processors to perform operations comprising:
receiving, from one or more computing devices, a request for image data representing an inventory location at a facility;
determining a type of the inventory location based at least in part on the request;
determining a region of the inventory location that is accessible by one or more users based at least in part on the type of the inventory location;
determining that a first imaging device has a first field-of-view (FOV) that includes the region;
determining that a second imaging device has a second FOV that includes the region;
determining first visibility data associated with the first imaging device, the first visibility data representing at least:
a first visibility of the region using the first imaging device, a first number of pixels associated with the region, and
a first angle of the first imaging device with respect to the inventory location;
determining, based at least in part on the first visibility data, a first visibility score of the first imaging device;
determining second visibility data associated with the second imaging device, the second visibility data representing at least:
  a second visibility of the region using the second imaging device,
  a second number of pixels associated with the region, and
  a second angle of the second imaging device with respect to the inventory location;
determining, based at least in part on the second visibility data, a second visibility score of the second imaging device;
determining that the first visibility score is greater than the second visibility score;
determining occlusion data associated with image data generated by the first imaging device, the occlusion data indicating a percentage of the region, represented by the image data, that is occluded by the one or more users;
determining that the percentage is less than a threshold percentage;
selecting the image data based at least in part on the first visibility score being greater than the second visibility score and the percentage being less than the threshold percentage; and
causing the selected image data to be stored.

19. The system as recited in claim 18, wherein the first visibility data further represents at least a percentage of pixels that are associated with the region.

20. The system as recited in claim 18, wherein the one or more computer-readable media storing instructions that, when executed by the one or more processors, cause the one or more processors to perform operations further comprising:
  outputting data representing a list of at least the first imaging device and the second imaging device, wherein the list is ordered based on the first visibility score of the first imaging device and the second visibility score of the second imaging device.

* * * * *